United States Patent
Kuwayama

(10) Patent No.: US 9,703,504 B2
(45) Date of Patent: Jul. 11, 2017

(54) STORAGE SYSTEM, RECORDING MEDIUM STORING DATA REBALANCING PROGRAM, AND DATA REBALANCING METHOD

(71) Applicant: FUJITSU LIMITED, Kawasaki-shi, Kanagawa (JP)

(72) Inventor: Takashi Kuwayama, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 242 days.

(21) Appl. No.: 14/303,886

(22) Filed: Jun. 13, 2014

(65) Prior Publication Data
US 2014/0297950 A1    Oct. 2, 2014

Related U.S. Application Data

(63) Continuation of application No. PCT/JP2011/079365, filed on Dec. 19, 2011.

(51) Int. Cl.
G06F 3/06    (2006.01)

(52) U.S. Cl.
CPC .......... *G06F 3/0653* (2013.01); *G06F 3/0617* (2013.01); *G06F 3/0619* (2013.01); *G06F 3/0632* (2013.01); *G06F 3/0635* (2013.01); *G06F 3/0689* (2013.01)

(58) Field of Classification Search
CPC .............................. G06F 3/0689; G06F 3/065
USPC ......................................................... 711/114
See application file for complete search history.

(56) References Cited

U.S. PATENT DOCUMENTS

| | | | |
|---|---|---|---|
| 7,194,575 B2* | 3/2007 | Nakanishi | G06F 3/0613 711/112 |
| 7,885,928 B2* | 2/2011 | Harrington | G06F 17/30206 707/637 |
| 2003/0191840 A1 | 10/2003 | Maciel | |
| 2003/0212872 A1 | 11/2003 | Patterson et al. | |

(Continued)

FOREIGN PATENT DOCUMENTS

| | | |
|---|---|---|
| JP | 1-246626 | 10/1989 |
| JP | 2003-296035 | 10/2003 |

(Continued)

OTHER PUBLICATIONS

Notification of Transmittal of Translation of the International Preliminary Report on Patentability (Form PCT/IB/338, Form PCT/IB/373 & Form PCT/ISA/237), PCT/JP2011/079365, 6 pages, dated Jul. 3, 2014.

(Continued)

*Primary Examiner* — Adam M Queler
*Assistant Examiner* — Edmund Kwong
(74) *Attorney, Agent, or Firm* — Fujitsu Patent Center

(57) ABSTRACT

A storage system includes a plurality of storing devices configured to store data, a cache memory configured to hold data, an access control unit configured to make an access to any one of the plurality of storing devices when an access request for reading of target data or writing of the target data is made from an information processing terminal, and to store the target data in the cache memory, and a writing unit configured to write the target data stored in the cache memory in the storing device which has not stored the target data among the plurality of storing devices.

19 Claims, 36 Drawing Sheets

(56) References Cited

U.S. PATENT DOCUMENTS

| | | | |
|---|---|---|---|
| 2004/0015658 A1* | 1/2004 | Kitamura | G06F 3/0601 711/114 |
| 2005/0154697 A1* | 7/2005 | Altaf | G06F 17/30575 |
| 2005/0216665 A1 | 9/2005 | Takakuwa | |
| 2006/0020691 A1* | 1/2006 | Patterson | G06F 3/061 709/223 |
| 2006/0031648 A1 | 2/2006 | Ishikawa et al. | |
| 2007/0118689 A1 | 5/2007 | Hyde, II et al. | |
| 2007/0288712 A1 | 12/2007 | Zimoto et al. | |
| 2008/0235449 A1 | 9/2008 | Hyde et al. | |
| 2009/0198946 A1 | 8/2009 | Ebata | |
| 2012/0005410 A1 | 1/2012 | Ikeuchi | |
| 2012/0239829 A1 | 9/2012 | Yamamoto et al. | |

FOREIGN PATENT DOCUMENTS

| | | |
|---|---|---|
| JP | 2003-339008 | 11/2003 |
| JP | 2004-5634 | 1/2004 |
| JP | 2005-284632 | 10/2005 |
| JP | 2006-53601 | 2/2006 |
| JP | 2006-99748 | 4/2006 |
| JP | 2007-72538 | 3/2007 |
| JP | 2007-149068 | 6/2007 |
| JP | 2007-310715 | 11/2007 |
| JP | 2007-328734 | 12/2007 |
| JP | 2009-187142 | 8/2009 |
| JP | 2010-277342 A | 12/2010 |
| JP | 4806089 B1 | 8/2011 |

OTHER PUBLICATIONS

International Search Report corresponding to PCT/JP2011/079365 mailed on Feb. 21, 2012.

Japanese Office Action mailed on Mar. 29, 2016 for corresponding Japanese Patent Application No. 2013-549973, with Partial English Translation, 5 pages.

* cited by examiner

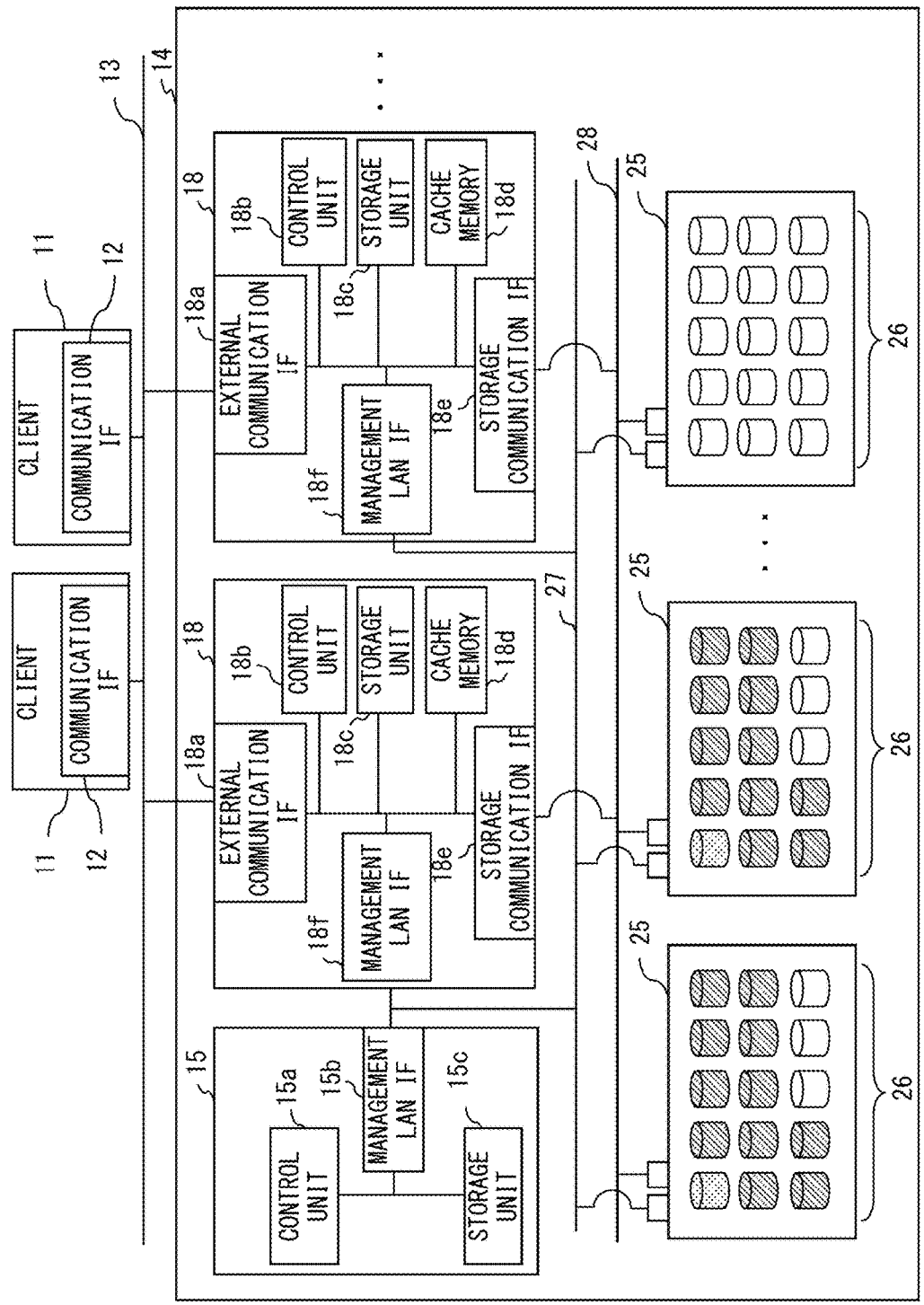
F I G. 2

| VIRTUAL VOLUME ID | STORAGE ID 1 | STORAGE ID 2 | ... |
|---|---|---|---|
| 1 | Created | Created | ... |
| 2 | Created | Created | ... |
| 3 | None | Created | ... |
| 4 | Created | Created | ... |
| 5 | Created | None | ... |
| 6 | Copying | Created | ... |
| ... | ... | ... | ... |

FIG. 4

| VIRTUAL VOLUME ID | STORAGE ID | POSITION | DATE |
|---|---|---|---|
| 1 | 2 | 8192-24576 | 1300848486 |
| 2 | 1 | 4192-12288 | 1300848487 |
| 3 | 2 | 4192-8192 | 1300848511 |
| 4 | 3 | 20480-24576 | 1300848725 |
| 5 | 1 | 24576-28672 | 1300848725 |
| 6 | 1 | 32768-36864 | 1300848842 |
| ... | ... | ... | ... |

32

F I G. 5

| STORAGE ID 1 | | |
|---|---|---|
| DISK ID | READ ACCESS FREQUENCY | WRITE ACCESS FREQUENCY |
| 1 | 102133 | 43 |
| 2 | 324 | 24 |
| 3 | 42351 | 2 |
| 4 | 431 | 0 |
| 5 | 6234652 | 5 |
| 6 | 453 | 5 |
| ... | ... | ... |

| VIRTUAL VOLUME ID 1 | STORAGE ID 1 | STORAGE ID 2 |
|---|---|---|
| | STORAGE ID 1 | STORAGE ID 2 |
| | REPLICA COMPLETENESS 34% | REPLICA COMPLETENESS 100% |
| OFFSET | | |
| 4096 | Created | Created |
| 8192 | Created | Created |
| 12288 | None | Created |
| 16384 | Created | Created |
| 20480 | None | Created |
| ... | ... | ... |

VIRTUAL VOLUME ID 2 ...

36

STORAGE ID 1

DISK ID 2

DISK ID 1

| TIME | Read | Write |
|---|---|---|
| 0:01:00 | 0 | 0 |
| 0:02:00 | 3654 | 0 |
| 0:03:00 | 15351 | 0 |
| 0:04:00 | 35155 | 0 |
| 0:05:00 | 9855 | 0 |
| ... | ... | ... |
| 8:40:00 | 15321 | 1532 |
| 8:41:00 | 35124 | 8125 |
| ... | ... | ... |
| 14:16:00 | 155 | 19844 |
| 14:17:00 | 512 | 13542 |
| ... | ... | ... |
| 23:58:00 | 0 | 0 |
| 23:59:00 | 0 | 0 |

FIG. 10

| STORAGE ID | STORAGE CAPACITY (%) |
|---|---|
| 1 | 56 |
| 2 | 21 |
| 3 | 4 |
| 4 | 93 |
| 5 | 73 |
| 6 | 0 |
| ... | ... |

39

F I G. 1 2

| STORAGE ID | I/Ops | BANDWIDTH USE RATE (%) | ⌒ 40 |
|---|---|---|---|
| 1 | 152 | 32.2 | |

F I G. 1 3

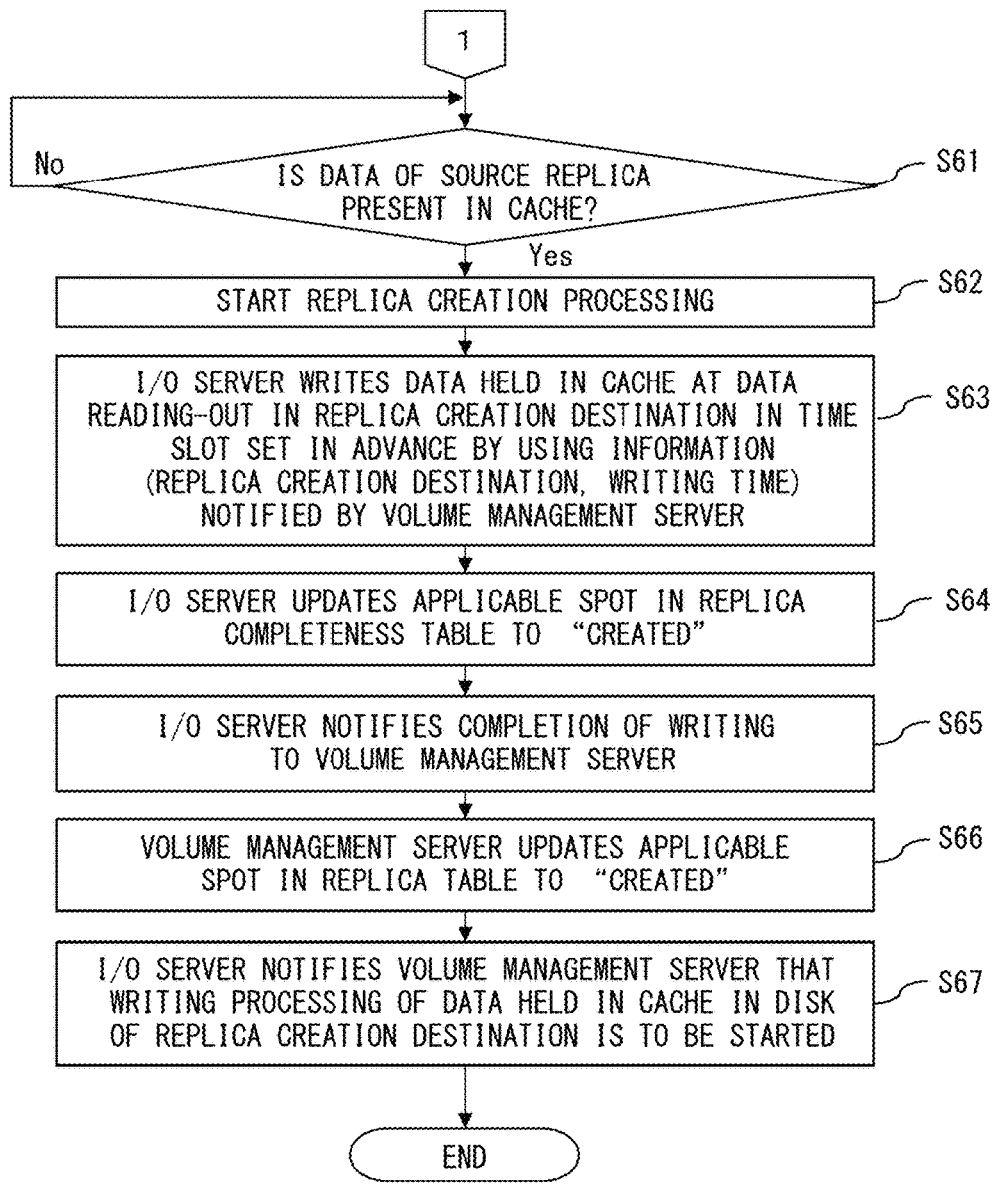
F I G. 1 7

| TIME | ACCESS FREQUENCY |
|---|---|
| 0:00~1:00 | 3325 |
| 1:00~2:00 | 2034 |
| 2:00~3:00 | 4524 |
| 3:00~4:00 | 4334 |
| 4:00~5:00 | 545 |
| 5:00~6:00 | 5444 |
| ... | ... |
| 23:00~24:00 | 28 |

FIG. 21A

| TIME | ACCESS FREQUENCY |
|---|---|
| 0:00~1:00 | 12 |
| 1:00~2:00 | 2332 |
| 2:00~3:00 | 32 |
| 3:00~4:00 | 233 |
| 4:00~5:00 | 5435 |
| 5:00~6:00 | 5235 |
| ... | ... |
| 23:00~24:00 | 1023 |

F I G. 2 2 A

| TIME | ACCESS FREQUENCY |
|---|---|
| 0:00~1:00 | 12 |
| 1:00~2:00 | 233 |
| 2:00~3:00 | 32 |
| 3:00~4:00 | 233 |
| 4:00~5:00 | 23 |
| 5:00~6:00 | 314 |
| ... | ... |
| 23:00~24:00 | 43 |

FIG. 23A

| TIME | ACCESS FREQUENCY |
|---|---|
| 0:00~1:00 | 1117 |
| 1:00~2:00 | 1964 |
| 2:00~3:00 | 1530 |
| 3:00~4:00 | 1600 |
| 4:00~5:00 | 2001 |
| 5:00~6:00 | 3665 |
| ... | ... |
| 23:00~24:00 | 365 |

FIG. 24A

| TIME | ACCESS FREQUENCY |
|---|---|
| 4:00~4:01 | 31 |
| ... | ... |
| 4:31~4:32 | 27 |
| ... | ... |
| 4:59~5:00 | 28 |

F I G. 2 5 A

| TIME | ACCESS FREQUENCY |
|---|---|
| 4:00~4:01 | 10 |
| ... | ... |
| 4:31~4:32 | 24 |
| ... | ... |
| 4:59~5:00 | 35 |

FIG. 26A

| TIME | ACCESS FREQUENCY |
|---|---|
| 4:00~4:01 | 27 |
| ... | ... |
| 4:31~4:32 | 29 |
| ... | ... |
| 4:59~5:00 | 28 |

F I G. 2 7 A

| TIME | ACCESS FREQUENCY |
|---|---|
| 4:00~4:01 | 31 |
| ... | ... |
| 4:31~4:32 | 31 |
| ... | ... |
| 4:59~5:00 | 31 |

F I G. 2 8 A

STORAGE SYSTEM, RECORDING MEDIUM STORING DATA REBALANCING PROGRAM, AND DATA REBALANCING METHOD

CROSS-REFERENCE TO RELATED APPLICATIONS

This application is a continuation application of International Application PCT/JP2011/079365 filed on Dec. 19, 2011 and designated the U.S., the entire contents of which are incorporated herein by reference.

FIELD

A technology described in this present invention relates to a storage system.

BACKGROUND

A storage system includes a plurality of storage devices and a server device controlling them. In a scale-out type storage system, data rebalancing (data rearrangement) processing is executed among the storage devices in order to ensure leveling of data at addition of the storage device. In data rebalancing, data biased in the storage device is copied to another storage device in many cases. Thus, while data rebalancing is being executed, a network bandwidth and a system resource are used.

Regarding load distribution of a logical volume, the following logical volume load distribution technologies are known. In storage devices, a performance measurement mechanism measures a load situation of the logical volume on the basis of a data amount transferred by a data transfer mechanism and a command processing amount. A copy mechanism copies contents of a logical volume set to a physical volume to a logical volume set to a spare physical volume on the basis of the measurement result of the performance measurement mechanism. Load distribution of data access is executed by having a plurality of pieces of copied data.

Patent Literature 1: Japanese Patent Laid-Open No. 2006-053601
Patent Literature 2: Japanese Patent Laid-Open No. 2007-149068
Patent Literature 3: Japanese Patent Laid-Open No. 2005-284632
Patent Literature 4: Japanese Patent Laid-Open No. 2006-99748
Patent Literature 5: Japanese Patent Laid-Open No. 2004-5634
Patent Literature 6: Japanese Patent Laid-Open No. 2007-72538

SUMMARY

A storage system includes a plurality of storing devices, a cache memory, an access control unit, and a writing unit. The storing device stores data. The cache memory holds data. The access control unit makes an access to any one of the storing devices, when an access request for reading of target data or writing of the target data is made from an information processing terminal, and stores the target data in the cache memory. The writing unit writes the target data stored in the cache memory in the storing device which has not stored the target data among the plurality of storing devices.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an entire configuration diagram of the system in this embodiment.

FIG. 4 illustrates an example of a replica table 31.

FIG. 5 illustrates an example of a writing pending table 32.

FIG. 8 illustrates an example of a read/write disk access load correspondence table 35.

FIG. 9 illustrates an example of a replica completeness degree table 36.

FIG. 10 illustrates an example of a disk I/O periodic table 37.

FIG. 12 illustrates an example of a storage capacity table 39.

FIG. 13 illustrates an example of load statistical information 40.

FIG. 17 illustrates a replica creation processing flow (No. 2) in this embodiment.

FIG. 21A illustrates a work table aggregating an access frequency obtained by adding a read frequency and a write frequency of the I/O periodic table 33 for a storage device A every 1 hour.

FIG. 22A illustrates a work table aggregating the access frequency obtained by adding the read frequency and the write frequency of the I/O periodic table 33 for a storage device B every 1 hour.

FIG. 23A illustrates a work table aggregating the access frequency obtained by adding the read frequency and the write frequency of the I/O periodic table 33 for a storage device C every 1 hour.

FIG. 24A illustrates an average value of the access frequency of the work tables illustrated in FIGS. 21 to 23 every 1 hour.

FIG. 25A illustrates a work table aggregating the access frequency obtained by adding the read frequency and the write frequency of the I/O periodic table 33 for a disk B1 of the storage device B every 1 minute.

FIG. 26A illustrates a work table aggregating the access frequency obtained by adding the read frequency and the write frequency of the I/O periodic table 33 for a disk B2 of the storage device B every 1 minute.

FIG. 27A illustrates a work table aggregating the access frequency obtained by adding the read frequency and the write frequency of the I/O periodic table 33 for a disk B3 of the storage device B every 1 minute.

FIG. 28A illustrates an average value of the access frequency of the work tables illustrated in FIGS. 25 to 27 every 1 minute.

DESCRIPTION OF EMBODIMENTS

In normally executed data rebalancing, access concentration to a specific storage can be avoided by copying data stored in a storage device to an added storage. In this copy processing, a network bandwidth between the storage devices is used. Therefore, since copying of data between the storage devices applies a load to a network, copying in a time slot in which a load to the storage device is low can be considered.

However, in the case of the storage device in which storages are integrated, the storage device is used by a plurality of systems, and the time slot in which a load to the network becomes low cannot be ensured in some cases. Moreover, during data copying, the network bandwidth is used at once, and the copying becomes a factor to cause a bottleneck in input/output between the storage device and a server.

In one aspect, this embodiment provides a technology of improving efficiency of data rebalancing in the storage system.

In the above described logical volume load distribution technology, the load distribution is realized by analyzing an access frequency and by uniquely creating a replica and duplication of a part of data. However, in this case, a bandwidth for copying is needed separately from the input/output (I/O) used for operations, and there can be an influence by this copying on the operations. Moreover, performances of a logical volume can be expanded only at initial setting which defines the logical volume, and on-demand performance expansion is impossible. Moreover, when a plurality of mirrors are made and writing is performed in those mirrors, if a load caused by the writing increases, a method of disassembling the mirrors is employed. However, disassembling of the mirrors due to a temporary load might deteriorate performances to the contrary, which is a problem. Furthermore, since the network bandwidth is used when the data is read, that gives an impact to the network bandwidth between the storage device and a client. Thus, the above described logical volume distribution technology cannot be used in a large-scale storage system.

Thus, efficiency of data rebalancing executed at addition of a storage device or load imbalance during operations is to be improved. At this time, when duplication of data to the plurality of storage devices is to be created, performances of input/output of the storage system is improved by efficiently using an access request from an information processing terminal.

Figure 1:
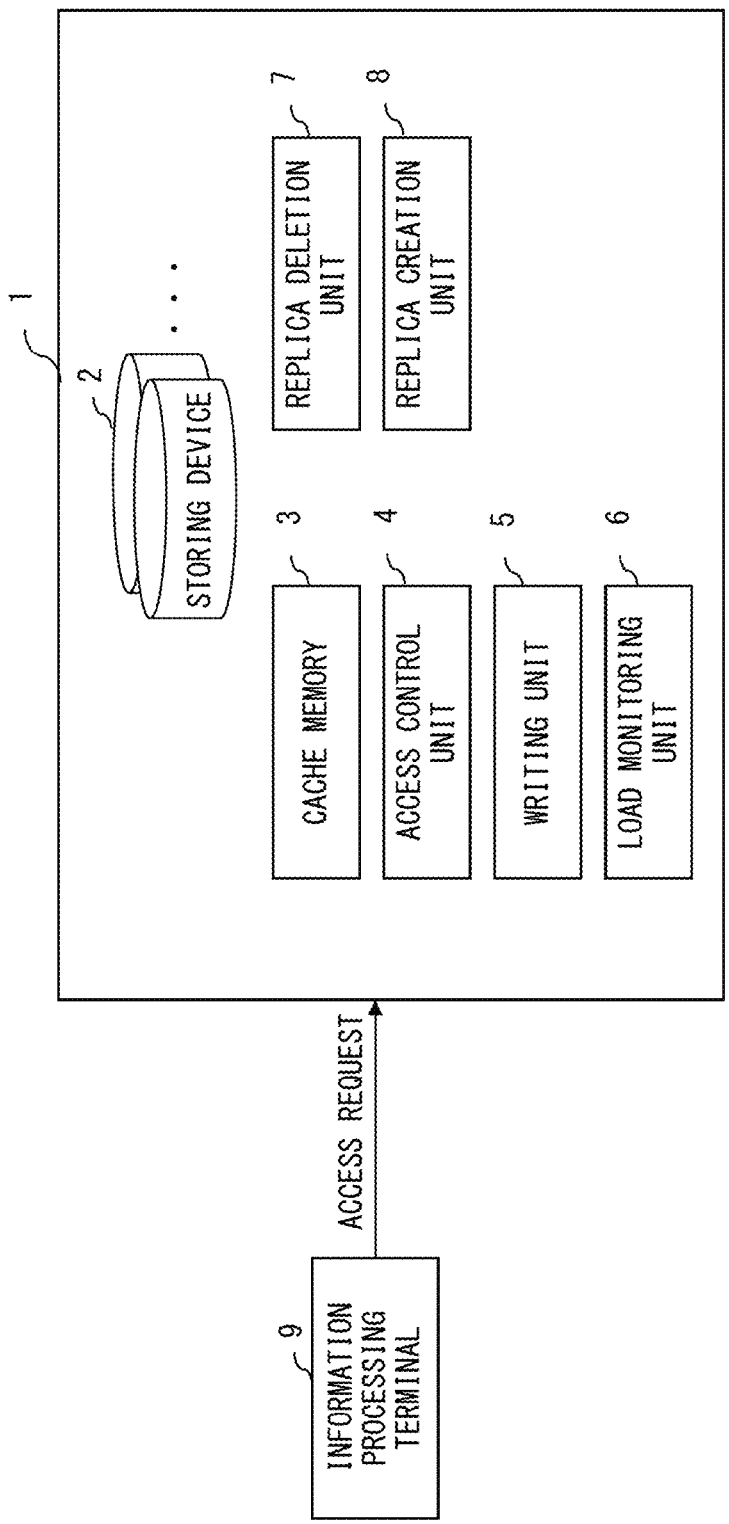
FIG. 1 illustrates a configuration of a storage system in this embodiment.

FIG. 1 illustrates a configuration of a storage system in this embodiment. The storage system 1 in this embodiment includes a plurality of storing devices 2, a cache memory 3, an access control unit 4, and a writing unit 5.

The storing device 2 stores data. An example of the storing device 2 is a storage device 25. The cache memory 3 holds data. An example of the cache memory 3 is an example of a cache memory 18d.

The access control unit 4 makes an access to any one of the storing devices 2, when an access request for reading of the target data or of writing of the target data is made from an information processing terminal 9, and stores the target data in the cache memory 3. An example of the access control unit 4 is an I/O server 18.

The writing unit 5 writes the target data stored in the cache memory 3 in the storing device 2 which has not stored the target data in the plurality of storing devices 2. An example of the writing unit 5 is the I/O server 18.

By means of configuration as above, efficiency of rebalancing processing among the storages can be improved. That is, when a storage device is added, the rebalancing processing among the storages can be efficiently executed without applying a load to the network by effectively utilizing an access request from the information processing terminal 9.

The storage system further includes a load monitoring unit 6. The load monitoring unit 6 monitors an access load due to reading or writing with respect to the storing device 2. An example of the load monitoring unit 6 is an example of a load monitoring unit 17.

The access control unit 4 makes an access to the storing device with the smallest access load among the storing devices 2 on the basis of a result of monitoring, when an access request is made from the information processing terminal 9, and stores the target data in the cache memory 3.

The access control unit 4 obtains the target data from the storing device with the smallest access load among the storing devices 2 which store the target data on the basis of the result of monitoring, when a reading request is made from the information processing terminal 9 to the target data. The access control unit 4 stores the target data in the cache memory 3 and transmits the target data to the information processing terminal.

The access control unit 4 writes the target data in the storing device with the smallest access load among the storing devices 2 on the basis of the result of monitoring, when a writing request of the target data is made from the information processing terminal 9, and stores the target data in the cache memory 3.

The writing unit 5 writes the target data stored in the cache memory 3 in the storing device 2 other than the storing device 2 in which writing was performed.

By means of configuration as above, the target data can be written in the storing device with the smallest access load among the storing devices 2 on the basis of the result of monitoring.

The storage system 1 further includes a replica deletion unit 7. The replica deletion unit 7 deletes the replica stored in any one of the storing devices 2 if there are three or more replicas of the virtual volume in a plurality of storing devices 2 when the writing access load of the replica of the virtual volume obtained by virtualizing the volumes of the plurality of storing devices 2 exceeds a threshold value. Alternatively, when there are three or more replicas of the virtual volume in the plurality of storing devices 2, the replica deletion unit 7 deletes the replica stored in any one of the storing devices 2, if a free space of the storing device 2 is smaller than the first threshold value in creation of the replica.

By means of configuration as above, when a writing request from the information processing terminal is frequently made or when a free space of the storage device becomes less, any one of replicas of virtual volumes having three or more replicas can be deleted.

The replica deletion unit 7 selects a replica of the storing device 2 with the smallest access load among the storing devices 2 including replicas on the basis of the result of monitoring. The replica deletion unit 7 deletes the selected replica, when it determines that there is no reading access to the selected replica with an access frequency exceeding a second threshold value at the current time and after on the basis of access frequency information indicating the access frequency to the storing device 2 gathered at every time.

By means of configuration as above, when an access exceeding the threshold value continues for a certain period of time after writing, the replica of the virtual volume can be excluded from the deletion target.

The storage system 1 further includes a replica creation unit 8. The replica creation unit 8 executes the following processing, when a difference between an access load in any one of time slots in the access loads at every time to anyone of the storing devices 2 and an average of the access loads in the time slot to all the storing devices 2 exceeds a third threshold value. That is, the replica creation unit 8 subdivides the time slot. The replica creation unit 8 determines whether or not a difference between an access load to any one of disks of any one of storing devices 2 in any one of subdivided time slots and an average of the access loads of any one of the subdivided time slots of all the disks in any one of the storing devices 2 is smaller than a fourth threshold value. If the difference is smaller than the fourth threshold value, the replica creation unit 8 creates a replica in a disk with the largest access loads at time before any one of the subdivided time slots and when the access load of anyone of the storing devices does not exceed a fifth threshold value.

By means of configuration as above, a replica can be created in a disk with the largest access loads for a storage device in which an access load to each disk is low but a high load is applied to the entire storage device.

In the storage system in this embodiment, two or more units of the storage devices are provided. Explanation will be made in the following on a premise that there are two units of storage devices, that is, a storage device A and a storage device B. A disk in the storage device A is assumed to hold a mirror state with the disk in the storage device B (that is, there are two replicas). These two disks are shown as one virtual disk in an I/O server.

The reason why the mirror state is held here is to prevent data loss or operation stop even if a disk or a storage device fails. It is assumed that there are a plurality of client devices which make accesses to a storage as in a cloud system.

FIG. 2 illustrates an entire configuration diagram of the system in this embodiment. In the system in this embodiment, a client device 11 and a storage system 14 are connected by a LAN (Local Area Network) 13. The client device 11 is connected to the LAN 13 via a communication interface (hereinafter an interface is referred to as an "IF") 12. The LAN 13 is an example and the network may be any other networks such as the Internet and an intranet.

The storage system 14 includes the volume management server 15, the I/O server 18, the storage device 25, a management LAN 27, and an I/O LAN 28.

The volume management server 15 controls the entire storage system 14 and manages a virtual volume 21 used in the I/O server 18. The volume management server 15 includes a control unit 15a, a management LAN IF 15b, and a storage unit 15c. The control unit 15a is to control an operation of the volume management server 15 and is a CPU (central processing unit), for example. The management LAN IF 15b is a communication interface for connection to the management LAN 27. The storage unit 15c stores a program for operating the control unit 15a, a program relating to this embodiment, tables which will be described later and the like. For the storage unit 15c, a ROM (read only memory), a RAM (random access memory), a hard disk, a flash memory and the like can be used, for example.

The I/O server 18 controls an input from the client device 11 and an output to the client device 11. The I/O server 18 includes an external communication IF 18a, a control unit 18b, a storage unit 28c, a cache memory (hereinafter referred to as a "cache") 18d, a storage communication IF 18e, and a management LAN IF 18f. The external communication IF 18a is a communication interface for connection to the LAN 13. The control unit 18b controls an operation of the I/O server 18 and controls a virtual volume obtained by virtualizing a disk of the storage and is a CPU (central processing unit), for example. The storage unit 18c stores a program for operating the control unit 18b, a program relating to this embodiment, tables and virtual volumes which will be described later and the like. As the storage unit 18c, a ROM (read only memory), a RAM (random access memory), a hard disk, a flash memory and the like can be used, for example. The storage communication IF 18e is a communication interface for connection to the I/O LAN 28. The management LAN IF 18f is a communication interface for connection to the management LAN 27.

The storage device 25 includes a plurality of disks 26. The storage device 25 is connected to the management LAN 27 and the I/O LAN 28. The management LAN 27 is a network used for monitoring instructions and loads and the like among the volume management server 15, the I/O server 18, and the storage device 25. The I/O LAN 28 is a network for transferring data stored in the storage device 25 or data to be stored in the storage device 25. The management LAN 27 and the I/O LAN 28 are not limited to LAN but may be a network such as SAN (storage area network) and the like.

The program for realizing processing explained in the embodiment below may be stored in the storage units 15c and 18b, for example, via the LAN 13 from a program provider side. Moreover, the program for realizing processing which will be described in the following embodiment may be stored in a commercially sold and distributed portable recording medium. In this case, this portable recording medium may be set in a reading device (not shown) of the storage system 14 so that its program is read out by the control units 15a and 18b and executed. As the portable recording medium, various forms of recording mediums such as a CD-ROM, a flexible disk, an optical disk, a magneto-optical disk, an IC card, a USB memory device and the like can be used. The program stored in these recording mediums is read by the reading device.

Figure 3:
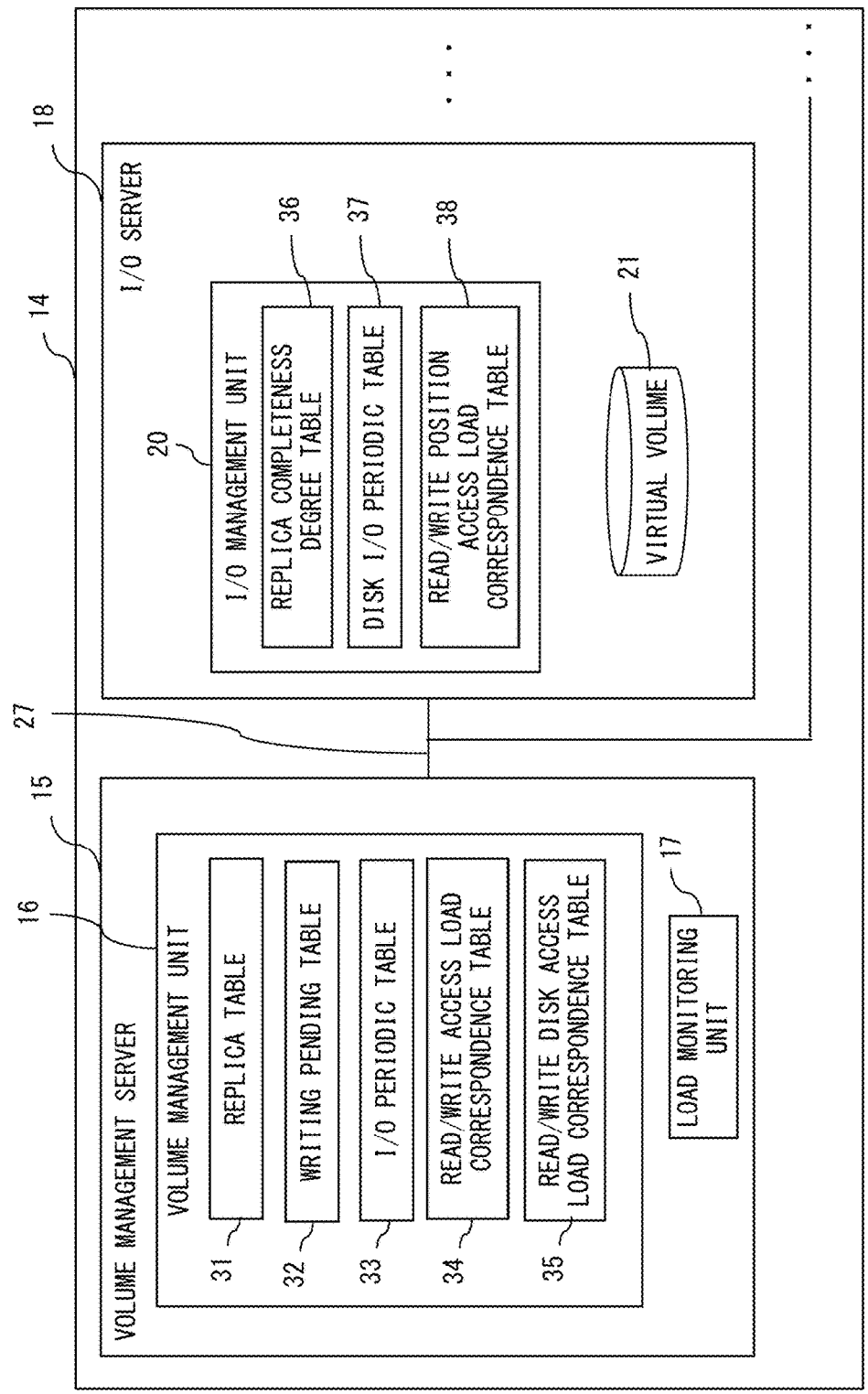
FIG. 3 illustrates a block diagram of a volume management server 15 and an I/O server 18.

FIG. 3 illustrates a block diagram of the volume management server 15 and the I/O server 18. The volume management server 15 includes a volume management unit 16 and a load monitoring unit 17. The volume management unit 16 manages the virtual volume 21 of each of the I/O servers 18. The load monitoring unit 17 monitors load information of each of the storage devices 25 and a load of the volume in the storage device 25.

The volume management unit 16 includes a replica table 31, a writing pending table 32, an I/O periodic table 33, a read/write access load correspondence table 34, and a read/write disk access load correspondence table 35. The replica table 31, the writing pending table 32, the I/O periodic table 33, the read/write access load correspondence table 34, and the read/write disk access load correspondence table 35 are stored in the storage unit 15c of the volume management server 15.

The I/O server 18 includes an I/O management unit 20 and the virtual volume 21. The I/O management unit 20 controls an access from the client device 11 to the virtual volume 21 and an output from the virtual volume 21 to the client device 11. The virtual volume 21 is stored in the storage unit 18c provided in the I/O server 18.

The I/O management unit 20 includes a replica completeness degree table 36, a disk I/O periodic table 37, and a read/write position access load correspondence table 38. The replica completeness degree table 36, the disk I/O periodic table 37, and the read/write position access load correspondence table 38 are stored in the storage unit 18c of the I/O server 18.

FIG. 4 illustrates an example of the replica table 31. The replica table 31 is a table indicating in which storage device 25 the replica of the virtual volume 21 is created or in what state the replica is.

The replica table 31 includes data items of "virtual volume ID", "storage ID 1", "storage ID 2", . . . . The "virtual volume ID" stores identification information for identifying the virtual volume 21. In the "storage ID 1", "storage ID 2", . . . , completeness degree of the replica in the storage device 25 corresponding to the virtual volume 21 is set. Here, when the completeness degree of the replica is 100%, "Created" is set. When the completeness degree of the replica is "0<completeness degree<100%", "Copying" is set. When the completeness degree of the replica is 0%, "None" is set. Moreover, when the replica is being deleted, "Deleting" is set.

FIG. 5 illustrates an example of the writing pending table 32. The writing pending table 32 is a table for managing data which is a writing target held in the cache 18d. The writing pending table 32 includes data items of "virtual disk ID", "storage ID", "position", and "date". The "virtual disk ID" stores identification information for identifying the virtual volume 21. The "storage ID" stores information (storage ID) for identifying the storage device 25 corresponding to the virtual volume 21. The "position" stores a writing position in the storage 25 at which the data is written. The "date" stores a date when it is written.

Figure 6:
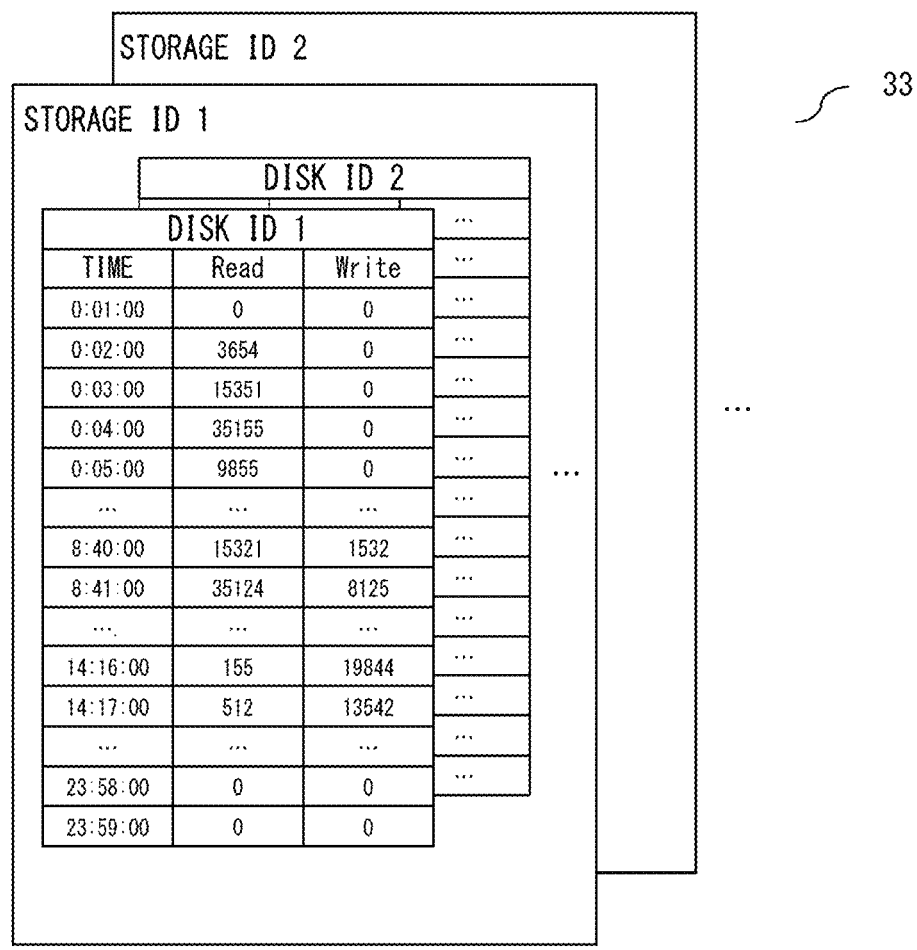
FIG. 6 illustrates an example of an I/O periodic table 33.

FIG. 6 illustrates an example of the I/O periodic table 33. The I/O periodic table 33 is a table gathering the number of accesses (read/write) of each disk of each of the storage devices 25 per unit time. The I/O periodic table 33 is created for each disk of the storage device 25.

The I/O periodic table 33 includes data items of "time", "read", and "write". The "time" stores time at certain intervals. The "read" stores the number of read accesses at that time. The "write" stores the number of write accesses at that time.

Figure 7:
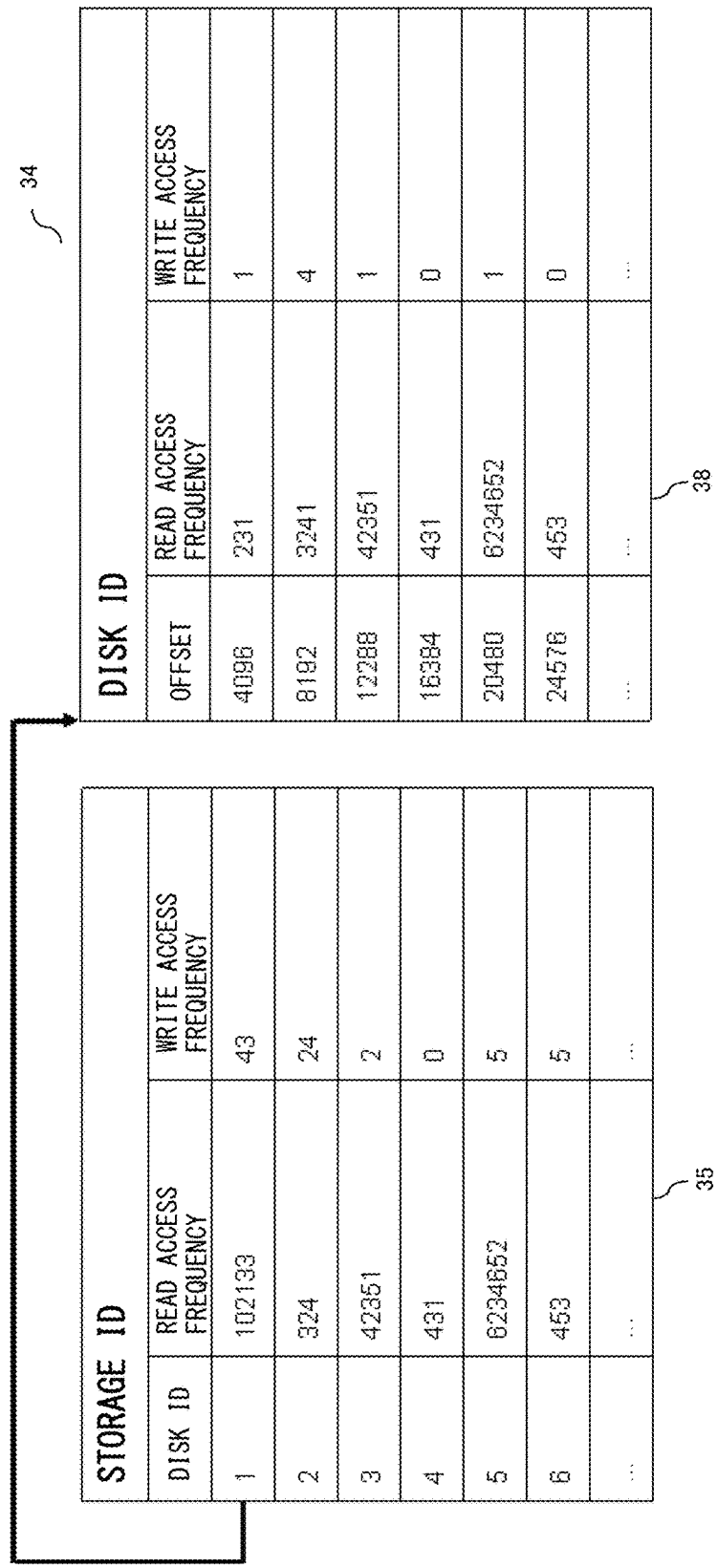
FIG. 7 illustrates an example of a read/write access load correspondence table 34.

FIG. 7 illustrates an example of the read/write access load correspondence table 34. The read/write access load correspondence table 34 is a table in which the disk ID of the read/write disk access load correspondence table 35 is associated with the disk ID of the read/write position access load correspondence table 38. The read/write access load correspondence table 35 and the read/write position access load correspondence table 38 will be described later.

FIG. 8 illustrates an example of the read/write disk access load correspondence table 35. The read/write disk access load correspondence table 35 is a table for counting the number of read access and write access to each disk present in all the storages 25.

The read/write disk access load correspondence table 35 includes data items of "disk ID", "Read access frequency", and "Write access frequency" by the unit of the storage device. In the "disk ID", identification information for identifying a disk 26 in the storage device 25 is set. In the "Read access frequency", a Read access frequency to that disk is set. In the "Write access frequency", a Write access frequency to that disk is set.

FIG. 9 illustrates an example of the replica completeness degree table 36. The replica completeness degree table 36 is a table illustrating completeness degree of the replica at each position for each of the storage devices 25 of the virtual volume. The replica completeness degree table 36 stores a "position" at which the replica is stored in the storage device 25, "replica completeness degree" of each storage device, and a "state" of the replica stored in the storage device 25.

The replica completeness degree is a value indicating how much the replica is completed. There are four states in the "state" of the replica, that is, "None", "Copying", "Created", and "Deleting". The "None" indicates that the replica has not been created. The "Copying" indicates a state prior to issuance of write processing to a replica creation destination. The "Created" indicates that the replica creation has been completed. The "Deleting" indicates that the replica is being deleted.

FIG. 10 illustrates an example of the disk I/O periodic table 37. This is a table gathering the number of accesses in each disk of the storage 25 per unit time. The disk I/O periodic table 37 is a table gathering the number of accesses by the I/O server to each disk 26 of the storage device 25 at every certain time. The disk I/O periodic table 33 is created for each disk of the storage device 25.

The disk I/O periodic table 33 includes data items of "time", "read", and "write". The "time" stores time at a certain interval. The "read" stores the number of read accesses at that time. The "write" stores the number of write accesses at that time.

Figure 11:
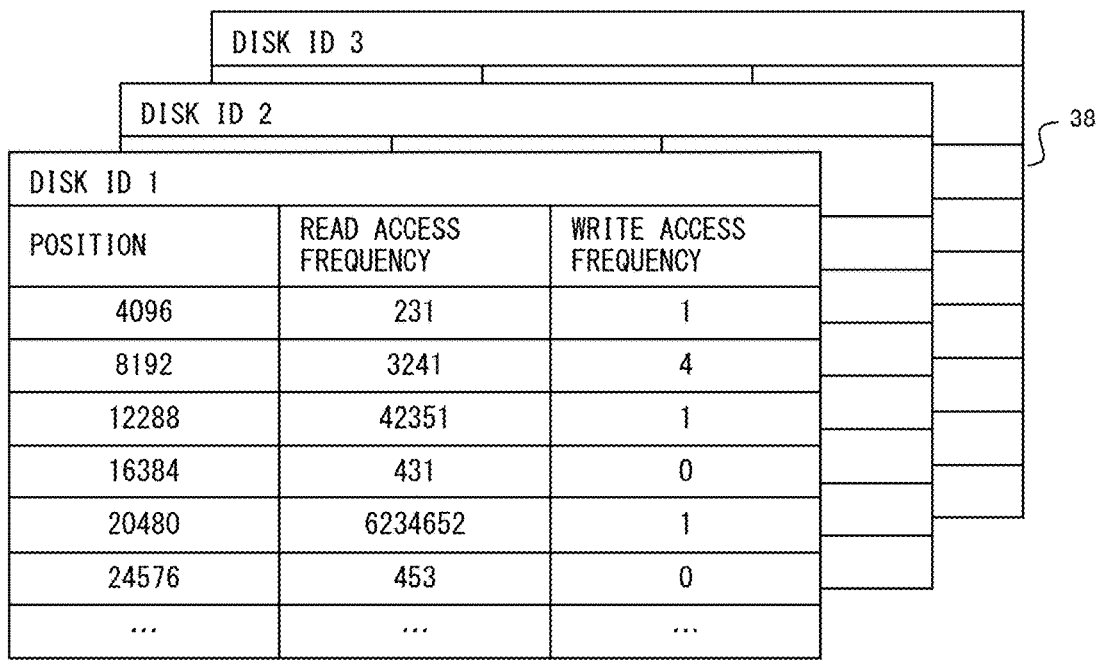
FIG. 11 illustrates an example of a read/write position access load correspondence table 38.

FIG. 11 illustrates an example of the read/write position access load correspondence table 38. The read/write position access load correspondence table 38 is a table for managing an access load of read/write at each position of the disk 26 to which the I/O server 18 is making an access. Here, the position for read/write in the disk 26 indicates a position to read/write data with respect to a beginning position in the disk 26.

The read/write position access load correspondence table 38 is provided for each unit and includes data items of "disk ID", "Read access frequency", and "Write access frequency". In the "disk ID", identification information for identifying the disk 26 in the storage device 25 is set. In the "Read access frequency", the Read access frequency to the disk 26 is set. In the "Write access frequency", the Write access frequency to the disk 26 is set.

FIG. 12 illustrates an example of a storage capacity table 39. The storage capacity table 39 is a table in which a volume of each storage device 25 is stored. The storage capacity table 39 is a list of volumes used by the storage devices, obtained by the load monitoring unit 17 of the volume management server 15 from each of the storage devices 25.

FIG. 13 illustrates an example of load statistical information 40. The load statistical information 40 is a table storing read/write per unit time (I/O per second) and a bandwidth use rate for each storage device 25. The volume management server 15 obtains the load statistical information 40 from each storage device 25 by using the load monitoring unit 17.

In this embodiment, the storage system 14 to which the storage device is added has two or more storage devices. For example, the storage system 14 has two storage devices, that is, the storage device A and the storage device B. The disk in the storage device A is assumed to hold a mirror state with the disk in the storage device B (that is, there are two replicas). A storage device to be added to the storage system 14 is assumed to be a storage device C.

(1) The storage device C is added to the storage system 14.

(2) By using the client 11, the following processing is executed upon a trigger of data reading/writing by a user.

(2-1) By using the load monitoring unit 17, the storage device 25 with fewer loads is selected.

(2-2) Data is read from the selected storage device 25.

(2-3) The read data is returned to the client 11.

(3) Data held in the cache at data reading is written in the disk of the storage device C at time when the network bandwidth of the storage device C is not pressed (there are three replicas at this point of time). As described above, by means of data transfer to the storage device C with fewer loads, reading performance at the subsequent reading can be improved.

(4) When only read is performed at a high frequency and also when reading performances have deteriorated in any replicas, when there is a newly added storage device, a replica is to be created.

(5) When a free space in the storage device 25 becomes small (a threshold value is set. It is 80%, for example), a free space is increased by deleting that with three or more replicas. Here, by using the I/O periodic table 33, a replica with a volume having a large quantity of reading period after writing is excluded from a deletion target. When there are three or more replicas, and when writing processing is executed frequently, the replica of the storage device with a high load is deleted on the condition that at least two replicas are maintained.

Details of this embodiment will be described below.

A storage device to be added to the storage system 14 is assumed to be the storage device C (25c). In this embodiment, a scene of new addition of the storage device 25 is explained, but rebalancing can be performed with a similar algorithm also after start of the operation.

(1) Addition of the storage device C (25c)

The storage device C (25c) is installed in the storage system 14 and is connected to the I/O LAN 28 so that all the clients 11 can make an access thereto.

(2) Data reading

Figure 14:
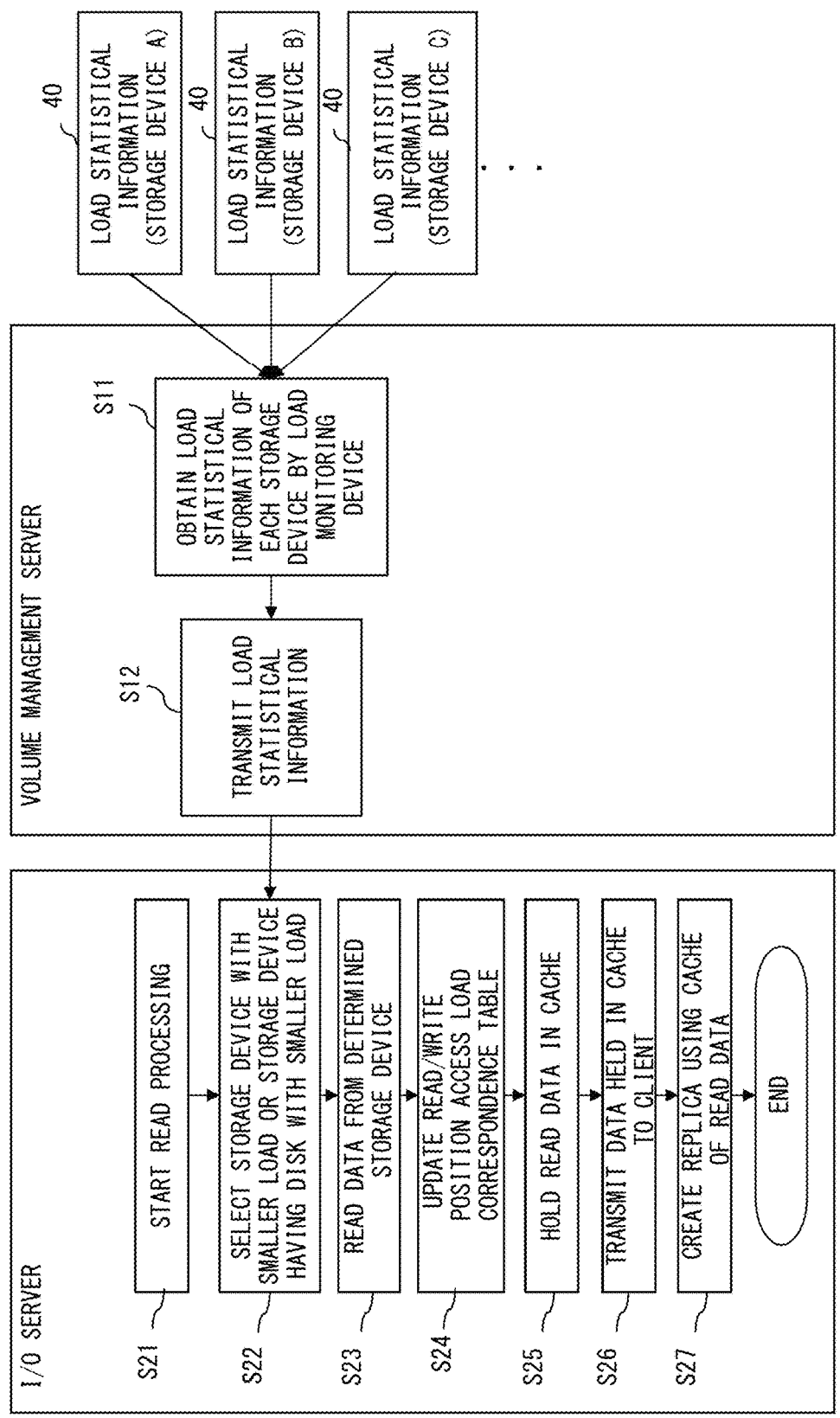
FIG. 14 illustrates a data reading flow in this embodiment.

FIG. 14 illustrates a data reading flow in this embodiment. Operations of the volume management server 15 and the I/O server 18 will be described below by using FIG. 14.

Selection of Reading Storage

The load monitoring unit 17 of the volume management server 15 monitors a load situation in each of the storage devices 25/load of the volume in the storage device (S11). Here, the load monitoring unit 17 obtains the load statistical information 40 transmitted from the storage device 25.

The volume management server 15 periodically transmits the load statistical information obtained from the storage device 25 to the I/O server 18 (S12).

Holding of Cache of Read Data

When a data reading request is made by the client 11, the I/O server 18 reads data from the disk 26 in the storage device 25 (S21). When it is determined that there are a plurality of replicas by referring to the replica completeness degree table 36, the I/O server 18 selects the storage device 25 with the lowest access load or the storage device 25 having the disk 26 with the lowest access load (S22). For example, the I/O server 18 selects the storage device 25 with the lowest access load by using the bandwidth use rate or I/Ops of the load statistical information received from the volume management server 15. Alternatively, the I/O server 18 selects the storage device 25 having the disk 26 with the lowest access load by using the read/write position access load correspondence table 38.

The I/O server 18 reads data from the storage device 25 selected at S21 or the storage device 25 having the disk 26 with the lowest access load (S23). At this time, the I/O server 18 updates a read access frequency at the position at which the disk 26 is read in the read/write position access load correspondence table 38 (S24).

When the data is read, the I/O server 18 holds the read data in the cache 18d in order to improve performances when the same data is read again (S25). The I/O server 18 transmits the data held in the cache 18d to the client 11 (S26). As a result, data reading is completed.

When the file on the file system of the storage device 25 is to be read, the I/O server 18 pre-reads the data and holds the pre-read data in the cache 18d.

Use of Cache of Read Data

The I/O server 18 makes a writing request to the replica of the added storage device 25c in a background of the data reading request from the client 11 by using the data (including pre-read data, if any) held in the cache 18d during reading (S27). By using the data held in the cache 18d, a network load applied to data copying for data rebalancing can be kept to ½ since reading for copying is not performed.

When the data is held in the cache 18d prior to a replica start instruction from the volume management server 15, the I/O server 18 executes the following processing. The I/O server 18 writes data in a replica creation destination at a point of time when the replica creation destination to be newly added to the virtual volume 21 is selected as will be explained at S56 and after in FIG. 16. As described above, by using the data held in the cache 18d, efficient replica creation can be realized.

(3) Data writing

Figure 15:
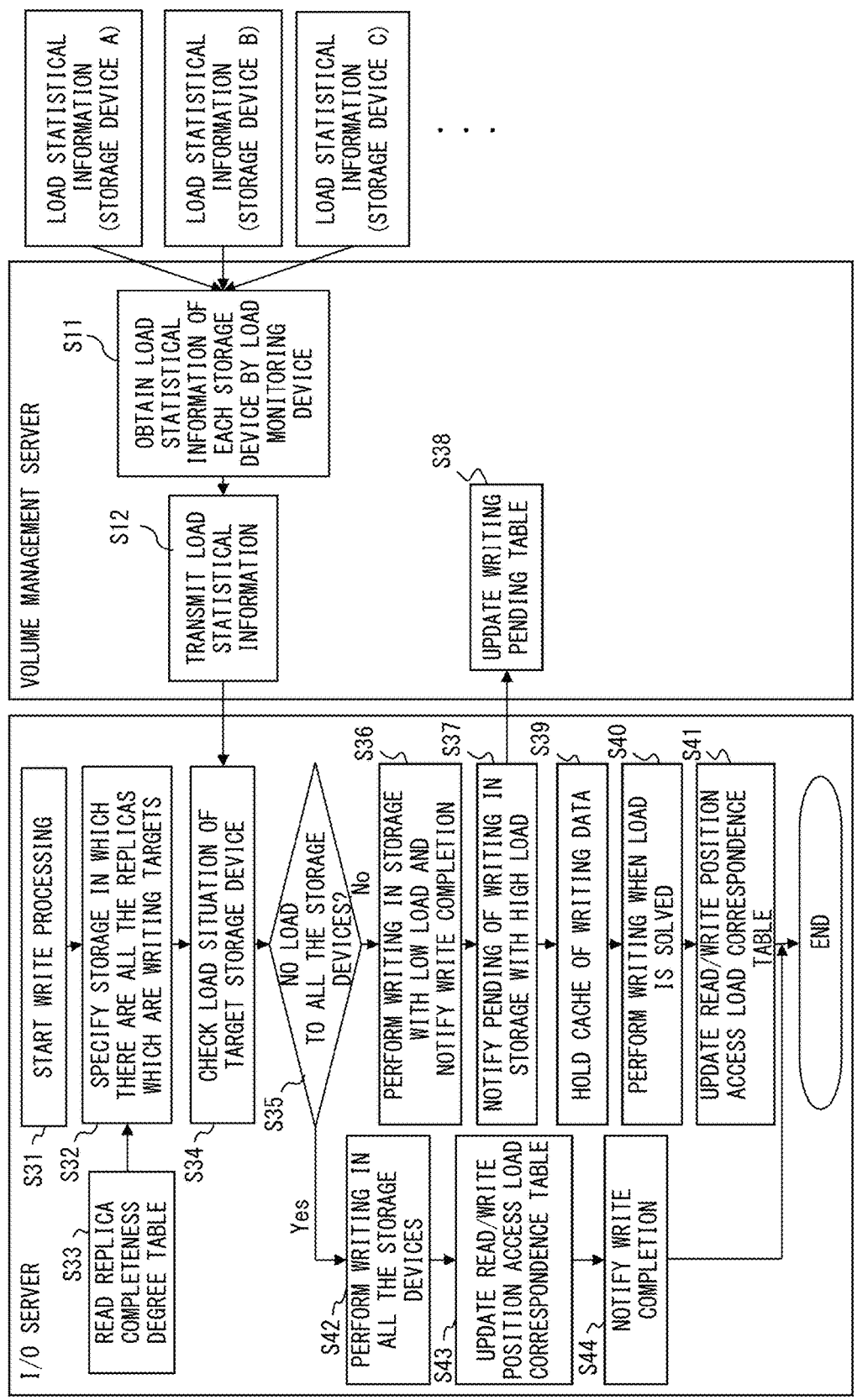
FIG. 15 illustrates a data writing flow in this embodiment.

FIG. 15 illustrates a data writing flow in this embodiment. The operations of the volume management server 15 and the I/O server 18 will be described below by using FIG. 15.

When a data writing request is made from the client 11, the I/O server 18 starts data writing processing to the real disk 26 of the virtual volume 21 (S31). At this time, the I/O server 18 reads the replica completeness degree table 36 (S33) in order to hold data integrity and obtains information of the storage device (target storage device) having a replica which is a writing target (S32).

The I/O server 18 checks a load situation of the target storage device 25 (S34) by using the load statistical information received from the volume management server 15 at S12. The I/O server 18 determines by using the load statistical information whether or not all the target storage devices 25 have no load, that is, whether or not the bandwidth use rates of all the target storage devices 25 are lower than a threshold value (S35). When the bandwidth use rates of all the target storage devices 25 are lower than the threshold value ("Yes" at S35), the I/O server 18 writes data in all the target storage devices 25 (S42). The I/O server 18 updates the read/write position access load correspondence table 34 (S43) for the target storage devices 25 in which data was written. The I/O server 18 notifies the client 11 which issued the writing request that the data writing has been completed (S44).

Writing in Plural Replicas

When the load of anyone of the target storage devices 25 is higher than the threshold value ("No" at S35), the I/O server 18 performs the following. That is, the I/O server 18 writes the writing target data in the storage device 25 with the lowest load or the disk with the lowest load by using the load statistical information or the read/write position access load correspondence table 38. When one session of writing is completed, the I/O server 18 notifies the client 11 which issued the writing request that the data writing has been completed (S36).

Handling of Storage for Which Writing is Pending

The I/O server 18 needs to perform writing in other storage devices 25 but writing of data at a high load causes performance deterioration. Thus, the I/O server 18 holds the writing data to the storage device 25 in which the load exceeds the threshold value and no room is left for I/O in the cache 18*d* so as to make writing of the data pending once. The data held in the cache 18*d* is not allowed to be disposed of. This will be described below.

When the writing target data into the storage device is made pending, the I/O server 18 notifies pending information to the volume management server 15 (S37). The pending information includes a storage ID of the target storage device 25 in which writing was not performed, a disk ID, a disk writing position and the writing data. The volume management server 15 updates the writing pending table 32 by using the pending information notified by the I/O server 18 (S38). The I/O server 18 holds the writing data in the cache 18*d* (S39).

During data reading from another I/O server 18, the another I/O server 18 refers to the writing pending table 32 and executes reading processing of data in the storage device 25 with the latest data in which there is data having been written. As a result, the latest data can be read.

Subsequently, the I/O server 18 writes the data held in the cache 18*d* in the storage device 25 when the load of the storage device 25 falls under the threshold value by using the load statistical information or the read/write position access load correspondence table 38 (S40). At this time, the I/O server 18 updates the write access frequency at the position written in the disk 26 of the storage device 25 in the read/write position access load correspondence table 38 (S41). When writing in the storage device 25 is completed, the I/O server 18 sends a completion notice to the volume management server 15. As a result, the same data can be read from all the storage devices 25.

Moreover, when the I/O server 18 is down in which the writing target data is made pending in the cache 18*d*, the writing target data made pending in the cache 18*d* is lost, and which replica is the latest cannot be managed. Thus, at start after down of the I/O server 18, the volume management server 15 checks when there is writing target data in the cache 18*d* of the writing pending table 32 and creates a replica as necessary.

By completing writing of data pending in the cache 18*d* for the storage device 25 performing replica creation in the storage device 25, the storage devices A, B, and the added storage device C hold the same data. At this time, the storage device A and the storage device B are kept in the mirror state. Moreover, the storage device C is brought in a state in which the data is written only for a unit having been written.

Here, in the added storage device C, the data held in the cache 18*d* in the read/write processing (frequently accessed data) can be kept in the mirror state, but the entire disk cannot be made into the mirror state. Therefore, at this point of time, data deletion cannot be performed for the entire disk of the source replica. However, in this case, since the data to which reading is performed is kept in the mirror state (since a replica has been created), data reading of the I/O server 18 to the storage device 25 can be distributed. As a result, since accesses (loads) to the storage device which is a reading destination are not concentrated to a single spot, performances of the storage system 14 can be improved.

(4) Access load distributing method by replica creation

Replica Creating Method

Figure 16:
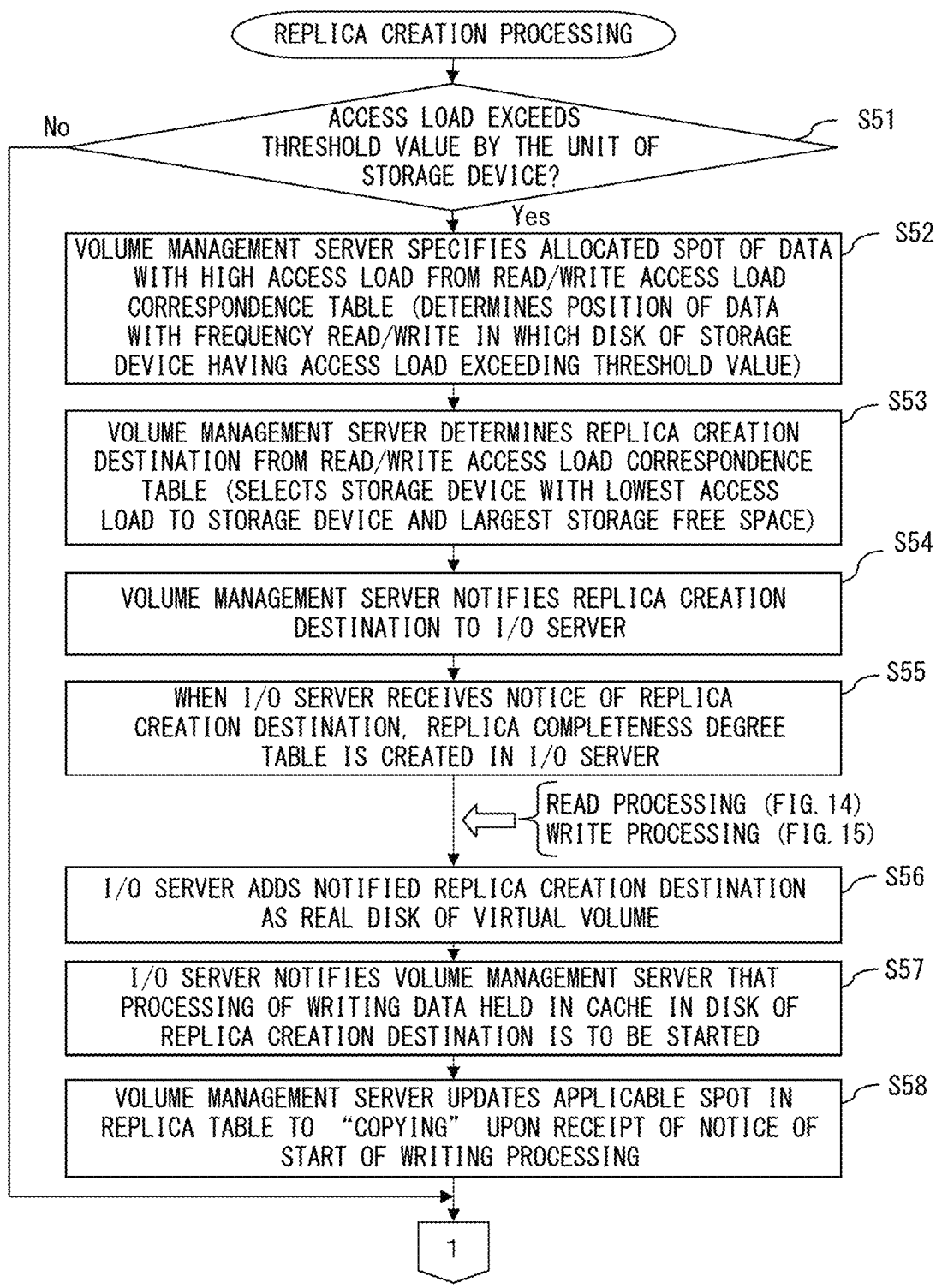
FIG. 16 illustrates a replica creation processing flow (No. 1) in this embodiment.

FIGS. 16 and 17 illustrate a replica creation processing flow in this embodiment. The operations of the volume management server 15 and the I/O server 18 will be described below by using FIGS. 16 and 17.

The volume management server 15 reflects the information obtained from the load monitoring unit 17 in the read/write disk access load correspondence table 35 at any time. Moreover, the volume management server 15 creates the read/write access load correspondence table 34 by using the read/write disk access load correspondence table 35 and the read/write position access load correspondence table 38 periodically sent from all the I/O servers 18.

First, the volume management server 15 determines by the unit of storage device whether or not the access load (read/write access frequency) exceeds a threshold value set in advance (S51) by using the read/write access load correspondence table 34.

When the access load exceeds the threshold value ("Yes" at S51), the volume management server 15 refers to the read/write access frequency of the disk in the read/write access load correspondence table 34 and specifies a position of the data with a high access load (S52). That is, the volume management server 15 determines the position of the data with frequent read/write in which disk in the storage device 25 having the access load (read/write access frequency) exceeding the threshold value by using the read/write access load correspondence table 34.

Moreover, the volume management server 15 determines a replica creation destination by using the read/write access load correspondence table 34 (S53). Here, the volume management server 15 selects the storage device 25 with the lowest access load by using the read/write access load correspondence table 34. Moreover, the volume management server 15 selects the storage device with the largest free space from the selected storage devices 25 as the replica creation destination.

Then, the volume management server 15 notifies the replica creation destination to the I/O server 18 (S54).

Upon receipt of the notice of the replica creation destination from the volume management server 15, the I/O server 18 creates the replica completeness degree table 36 for the virtual volume 21 (S55). The read processing (FIG. 14) and the write processing (FIG. 15) occur between S55 and S56.

After creation of the replica completeness degree table 36, the I/O server 18 adds the disk of the replica creation destination to one of the real disks of the applicable virtual volume 21 (S56). The I/O server 18 notifies the volume management server 15 that writing of the data held in the cache into the disk of the replica creation destination is to be started (S57).

Upon receipt of the notice from the I/O server 18 that writing of the data held in the cache into the disk of the replica creation destination is to be started, the volume management server 15 updates the applicable spot in the replica table 31 to "Copying" (S58).

Writing of Data in Replica

When there is data of a source replica in the cache 18d ("Yes" at S61), subsequent to the reading processing of data from the client 11 to the storage device 25 which is the source replica, the I/O server 18 starts the replica creation processing (S62) by using the cache 18d. Moreover, prior to a replica creation request from the volume management server 15, the I/O server 18 updates the replica completeness degree table 36 and performs writing in the disk of a replica creation target for the data having been held in the cache 18d. By using the data already held in the cache 18d, the update processing of the replica can be proceeded with.

The I/O server 18 writes the data held in the cache 18d at data reading-out in the replica destination at time set in advance (S63) by using information (replica creation destination, writing time) notified by the volume management server 15. After writing is completed, the I/O server 18 updates the disk 26 of the storage device 25 in which writing was performed to "Created" in the replica completeness degree table 36 (S64).

In the replica completeness degree table 36, when the replica completeness degree reaches 100%, the I/O server 18 notifies the volume management server 15 that replica creation has been completed (S65). The volume management server 15 updates the applicable spot in the replica table 31 to "Created" (S66).

The I/O server 18 notifies the volume management server 15 that processing of writing the data held in the cache 18d into the disk of the replica creation destination is to be started (S67).

Replica Deleting Method

When a writing request from the client 11 is frequently made, writing to all the replicas occurs frequently and thus, a load in the network bandwidth becomes high. When writing occurs frequently, the I/O server 18 determines whether or not the replica should be deleted by the following processing.

(i) When the I/O server 18 determines that the writing target data has a large quantity of a reading period after that from data reading amount/writing amount by using the disk I/O periodic table 37, the replica is not deleted.

(ii) When the I/O server 18 determines that the writing period would continue for a certain period of time by using the disk I/O periodic table 37, the replica is deleted.

Figure 18:
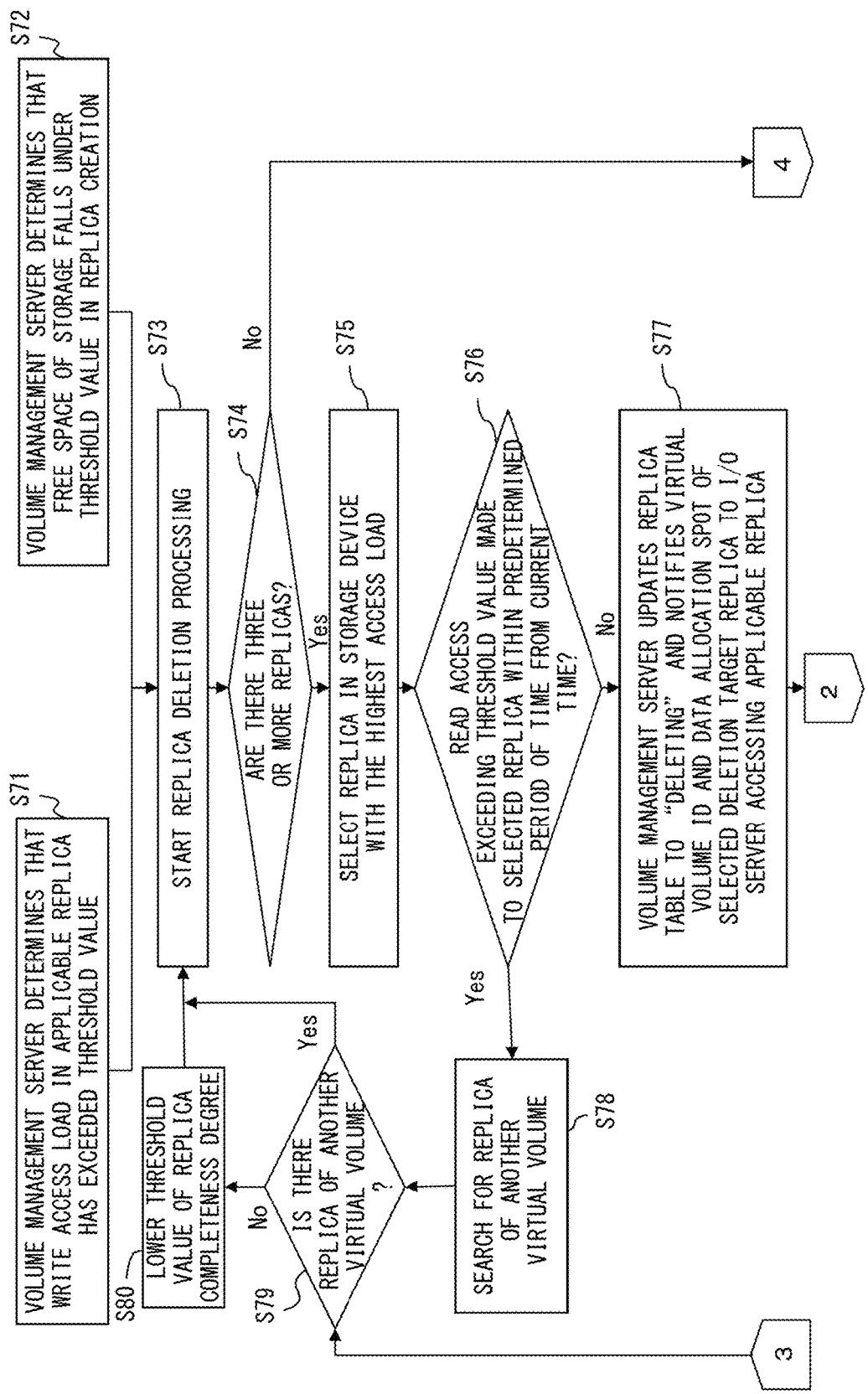
FIG. 18 illustrates a replica deletion processing flow (No. 1) in this embodiment.
Figure 19:
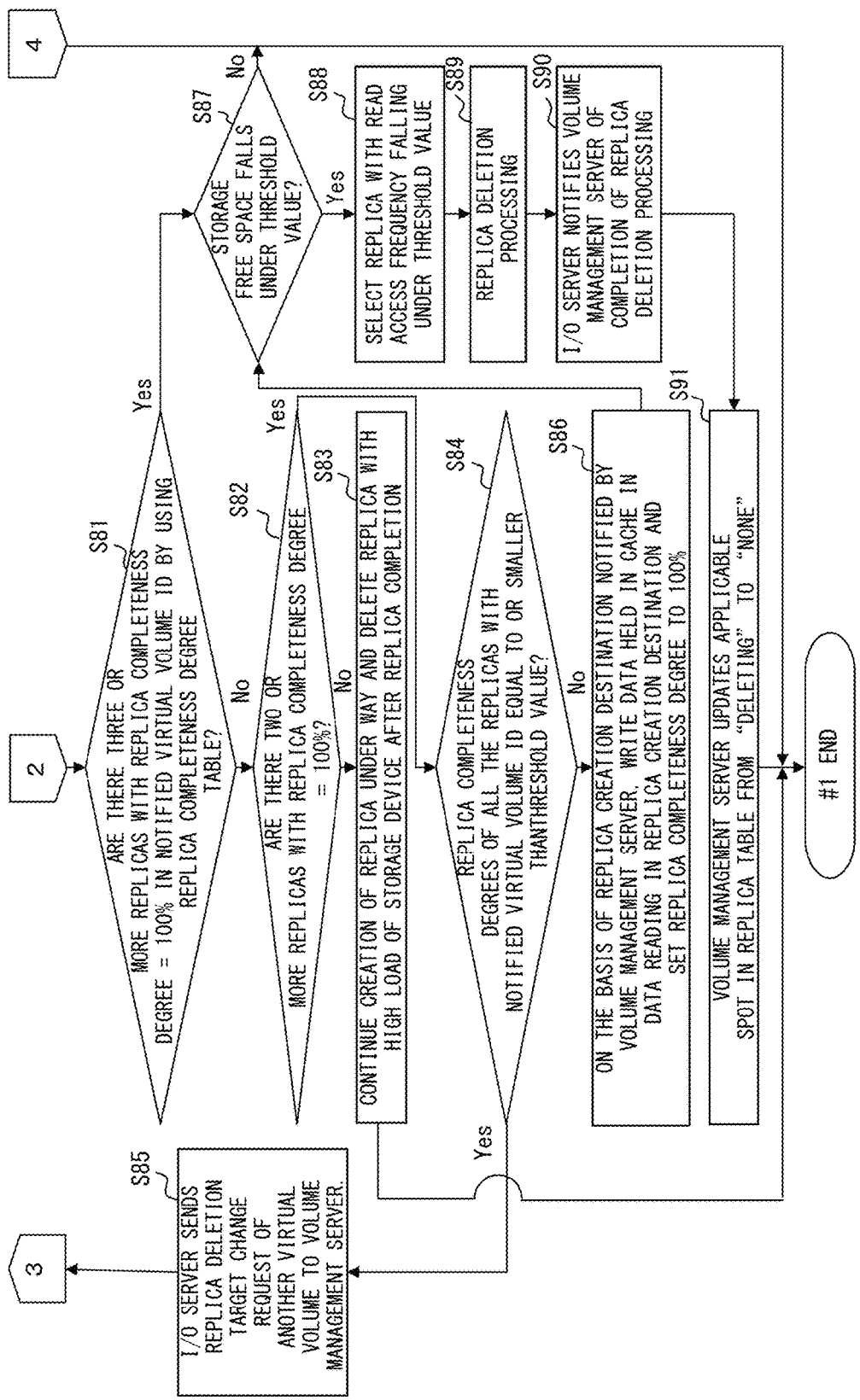
FIG. 19 illustrates a replica deletion processing flow (No. 2) in this embodiment.

FIGS. 18 and 19 illustrate a replica deletion processing flow in this embodiment. The operations of the volume management server 15 and the I/O server 18 will be described below by using FIGS. 18 and 19.

When the volume management server 15 determines that any one of the following conditions (S71, S72) is met, the volume management server 15 notifies start of the replica deletion processing to the I/O server 18 (S73). The condition at S71 is that the volume management server 15 determines that the write access frequency to the data in the replica in any one of the virtual volumes exceeds a threshold value on the basis of the write access frequency of the read/write access load correspondence table 34. The condition at S72 is that the volume management server 15 determines that the free space of the storage device 25 falls under the threshold value in replica creation of any one of the virtual volumes by using the storage capacity table 39.

Method of Determining Replica to be Deleted

In the replica deletion processing, the volume management server 15 refers to the replica table 31 and determines whether or not the number of replicas of any one of the virtual volumes indicated as "Created" is three or more (S74). When the number of replicas is less than three ("No" at S74), the volume management server 15 does not execute the replica deletion processing.

When the number of replicas is three or more, the volume management server 15 selects the replica in the storage device 25 to which the highest access load is applied by using the write access frequency item in the read/write access load correspondence table 34 (S75).

The volume management server 15 associates the read/write access load correspondence table 34 with the I/O periodic table 33 and determines whether or not read accesses exceeding the threshold value are made to the disk in which the selected replica is present within a predetermined period of time from the current time (S76).

When it is determined for the selected replica that read accesses exceeding the threshold value are not made within the predetermined period of time from the current time ("Yes" at S76), the volume management server 15 does not execute the replica deletion processing for the virtual volume 21. At this time, the volume management server 15 searches for the replica of another virtual volume 21 (S78).

when there is a replica of another virtual volume ("Yes" at S79), the volume management server 15 executes processing at S73 and after for the another virtual volume. When there is no replica of another virtual volume ("No" at S79), the volume management server 15 notifies the I/O server 18 that the threshold value of the replica completeness degree used at S84 should be dynamically lowered by a predetermined value (S80). Then, the volume management server 15 executes the processing at S73 and after again for the virtual volume. Upon receipt of the notice, the I/O server 18 dynamically lowers the threshold value of the replica completeness degree used at S84 by the predetermined value.

Execution of Replica Deletion

When it is determined for the selected replica that read accesses exceeding the threshold value are made within the predetermined period of time from the current time ("No" at S76), the volume management server 15 updates the applicable spot in the replica table 31 to "Deleting". Subsequently, the volume management server 15 notifies deletion information of the selected replica (virtual volume ID, data arrangement spot) to the I/O server 18 making an access to the applicable replica (S77).

The I/O server 18 receives the deletion information of the selected replica from the volume management server 15. The I/O server 18 determines whether or not there are three or more replicas with the replica completeness degree at 100% relating to the notified virtual volume ID by using the replica completeness degree table 36 (S81).

In the replica completeness degree table 36, when there are not three or more replicas with the replica completeness degree at 100% ("No" at S81), the I/O server 18 continues the replica creation of the replica being created. After completion of the replica, the I/O server 18 deletes the replica of the storage device 25 with a high load selected at S75 (S83) and ends the replica deletion processing.

The I/O server 18 determines whether or not all the replica completeness degrees of the notified virtual volume IDs are equal to or less than the predetermined threshold value in the replica completeness degree table 36 (S84). When all the replica completeness degrees of the notified virtual volume IDs are equal to or less than the predetermined threshold value (80%, for example) ("Yes" at S84), the I/O server 18 makes a change request of a deletion target of the replica of another virtual volume to the volume management server 15 (S85).

When there is a replica of another virtual volume ("Yes" at S79), the volume management server 15 executes processing at S73 and after for the another virtual volume. When there is no replica of another virtual volume ("No" at S79), the volume management server 15 notifies the I/O server 18 that the threshold value of the replica completeness degree used at S84 should be dynamically lowered by a predetermined value (S80). Then, the volume management server 15 executes the processing at S73 and after again for the virtual volume. Upon receipt of the notice, the I/O server 18 dynamically lowers the threshold value of the replica completeness degree used at S84 by the predetermined value. As a result, the volume management server 15 can make a replica deletion request to the I/O server 18 again.

When all the replica completeness degrees of the notified virtual volume IDs are higher than the predetermined threshold value (80%, for example) ("No" at S84), the I/O server 18 executes the following processing. That is, the I/O server 18 writes the data held in the cache 18d at data reading in the replica creation destination by using the replica creation destination information notified by the volume management server 15 at S54 and sets the replica completeness degree to 100% (S86).

In the replica completeness degree table 36, when there are three or more replicas with the replica completeness degree at 100% relating to the notified virtual volume ID ("Yes" at S81), or after the processing at S86 is completed, the I/O server 18 executes the following processing. That is, the I/O server 18 determines whether or not the free space of the storage device 25 falls under the threshold value (S87). When the free space of the storage exceeds the threshold value ("No" at S87), the replica deletion processing is finished.

When the free space of the storage device 25 falls under ("Yes" at S87), the I/O server 18 selects the replica with the read access frequency falling under the threshold value from the replicas with the replica completeness degree at 100% by using the read/write position access load correspondence table 38 (S88). At this time, the I/O server 18 selects the replica of the storage device 25 with the highest load in the storage devices 25 holding the replicas with the replica completeness degree at 100%. The I/O server 18 deletes the selected replica (S89).

Then, the I/O server 18 notifies the completion of the replica deletion processing to the volume management server 15 (S90). Upon receipt of the completion notice of the replica deletion processing from the I/O server 18, the volume management server 15 updates the applicable spot in the replica table 31 from "Deleting" to "None" (S91) and ends the replica deletion processing.

Prediction Replica Creation Processing Using I/O Periodic Table

When there are many disks with low access loads that cannot be completely grasped by the above described "(4) Access load distributing method by the replica creation", the load might become high in view of the unit of the storage device. Thus, in the data rebalancing in such a situation, a method of load distribution by creating a replica by using the I/O periodic table is used.

Figure 20:
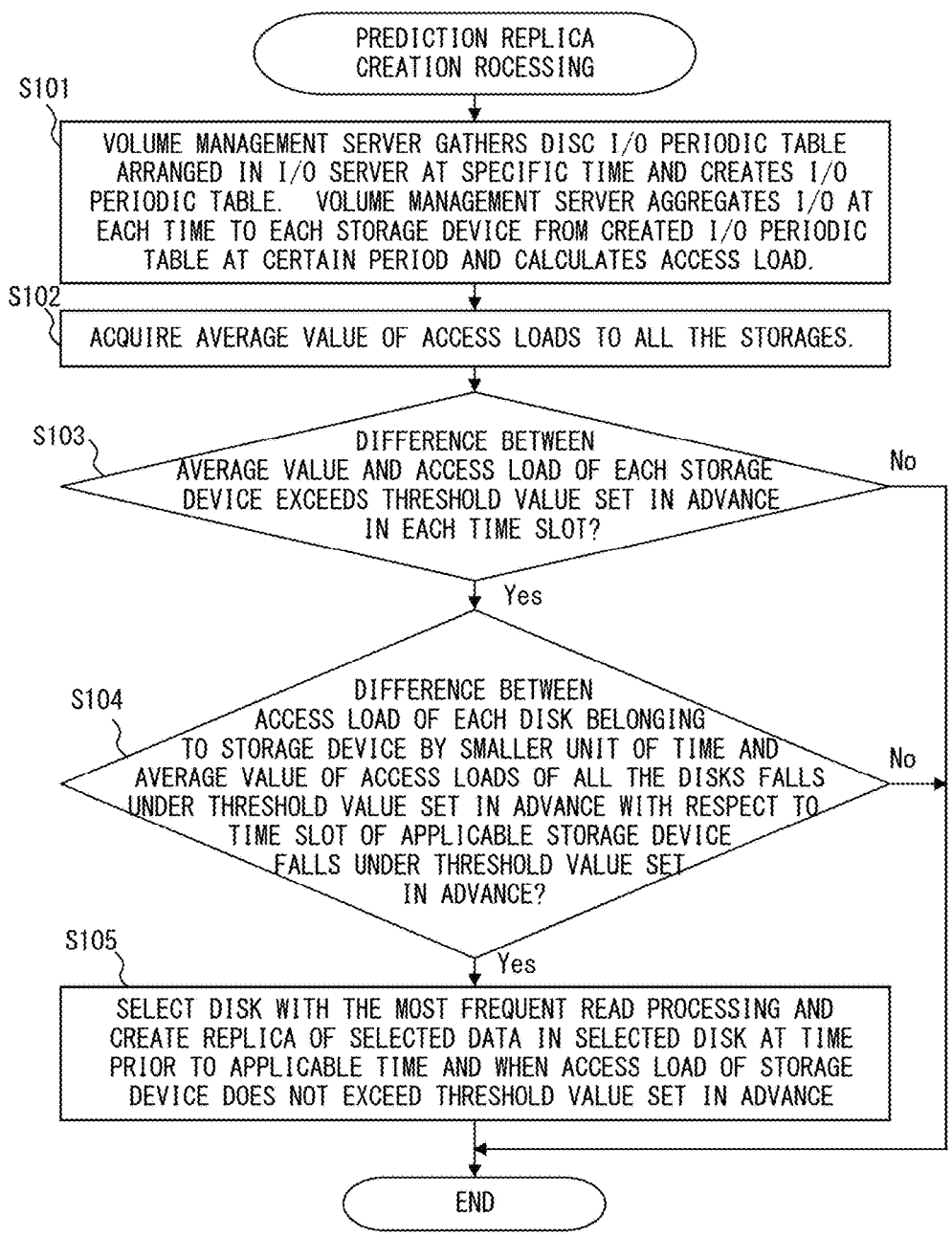
FIG. 20 illustrates a prediction replica creation processing flow using the I/O periodic table.

FIG. 20 illustrates a prediction replica creation processing flow using the I/O periodic table. The I/O server 18 aggregates input/output (I/O) at certain intervals (period) (that is, the number of read accesses and the number of write accesses) in a period of time set in advance by the unit of disk in the storage device 25 and stores the result in the disk I/O periodic table 37. When this certain interval (period) is operations for a unit of a week, the I/O server 18 can aggregate input/output in one week. The processing in FIG. 20 may be executed in the processing at S54 in FIG. 16.

The volume management server 15 collects the disk I/O periodic tables 37 from all the I/O servers 18 at predetermined time. The volume management server 15 aggregates the number of read accesses and the number of write accesses of the disk of the storage device at every time by using the collected all the disk I/O periodic tables 37 and creates the I/O periodic table 33.

The volume management server 15 aggregates the I/O (the total of the number of read accesses and the number of write accesses) per time with respect to each of the storage devices 25 from the created I/O periodic table 33 in a certain period and calculates an access load of the storage device (S101). For example, the volume management server 15 calculates the hourly access load of the storage device 25 for one day. Here, the access load means the total of the number of read accesses and the number of write accesses.

Subsequently, the volume management server 15 calculates an average value of the access loads to all the storage devices 25 (S102). Subsequently, the volume management server 15 determines whether a difference between the average value and the access load of each of the storage devices 25 in the time slot for aggregation exceeds a threshold value set in advance (S103). When the difference of the access load does not exceed the threshold value ("No" at S103), the volume management server 15 ends the prediction processing.

When the difference of the access load exceeds the threshold value ("Yes" at S103), the volume management server 15 executes the following processing. That is, the volume management server 15 acquires a difference between the access load of each disk 26 and the average value of the access loads of all the disks 26 belonging to the storage device 25 by the smaller time slot for the applicable time of the applicable storage device 25. The smaller time slot means the unit of a minute, for example.

The volume management server 15 determines whether the difference falls under a threshold value set in advance (S104). When the difference falls under the threshold value set in advance ("Yes" at S104), the volume management server 15 selects the disk 16 with the largest number of execution times of the read processing in the disks 26 in the applicable storage device 25 using the I/O periodic table 33. The volume management server 15 creates a replica in the selected disk 26 in a time slot prior to the applicable time and also in which the access load of the storage device 25 does not exceed the threshold value set in advance (S105).

An example of the prediction replica creation processing for the data with a high access load by the unit of the storage device 25 and a low access load by the unit of disk using the I/O periodic table 33 is illustrated below. First, the processing at S101 to S103 in FIG. 20 will be described by using FIGS. 21 to 24.

Figure 21B:
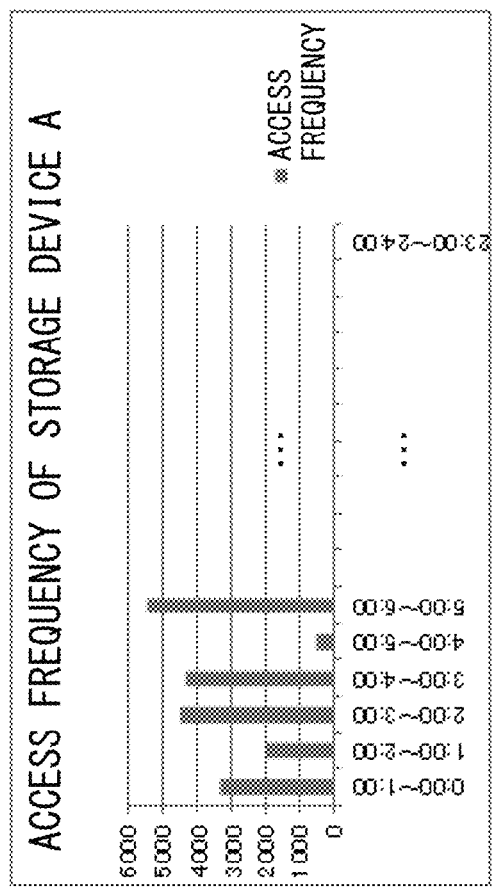
FIG. 21B illustrates a graph corresponding to FIG. 21A.
Figure 22B:
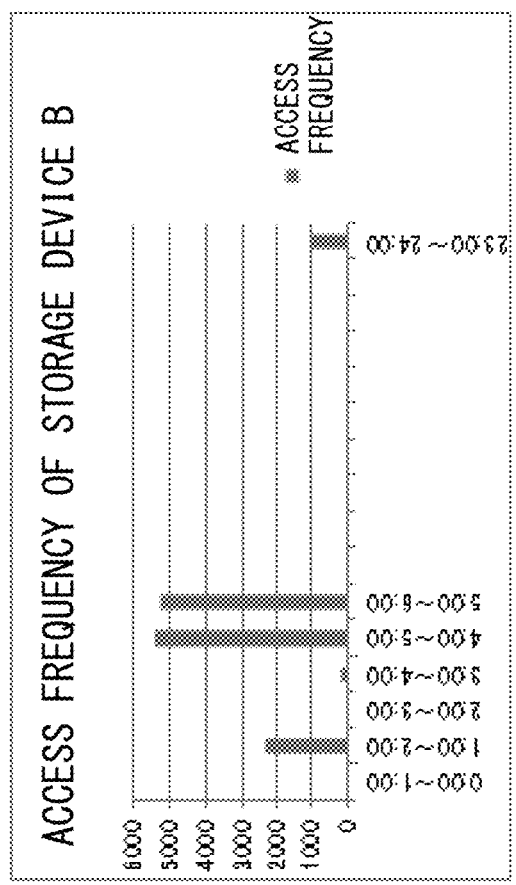
FIG. 22B illustrates a graph corresponding to FIG. 22A.
Figure 23B:
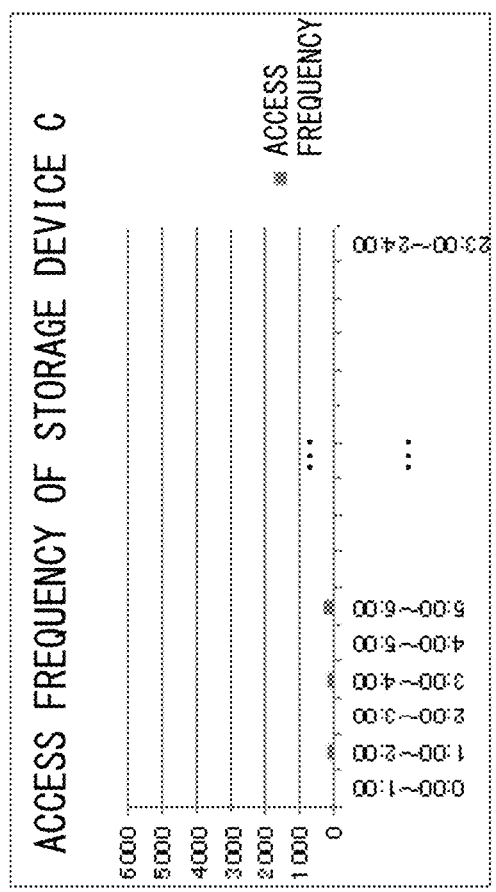
FIG. 23B illustrates a graph corresponding to FIG. 23A.
Figure 24B:
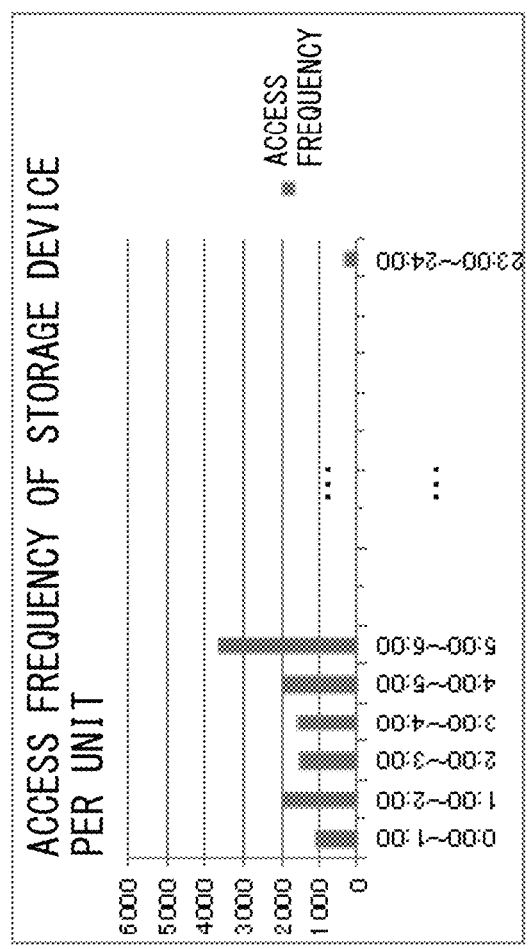
FIG. 24B illustrates a graph corresponding to FIG. 24A.

FIG. 21A illustrates a work table aggregating the access frequencies obtained by adding the read frequency and the write frequency in the I/O periodic table 33 for the storage device A every hour. FIG. 21B illustrates a graph corresponding to FIG. 21A. FIG. 22A illustrates a work table aggregating the access frequency obtained by adding the read frequency and the write frequency in the I/O periodic table 33 for the storage device B every hour. FIG. 22B illustrates a graph corresponding to FIG. 22A. FIG. 23A illustrates a work table aggregating the access frequency obtained by adding the read frequency and the write frequency in the I/O periodic table 33 for the storage device C every hour. FIG. 23B illustrates a graph corresponding to FIG. 23A. FIG. 24A illustrates an average value of the access frequencies every hour of the work tables illustrated in FIGS. 21 to 23. FIG. 24B illustrates a graph corresponding to FIG. 24A.

The volume management server 15 collects the disk I/O periodic tables 37 from all the I/O servers 18 and creates the I/O periodic table 33 and then, calculates the access loads of the three storage devices A, B, and C as illustrated in FIGS. 21 to 23. After the calculation of the access load, the volume management server 15 calculates an average value of the access loads to the three storage devices A, B, and C as illustrated in FIGS. 24A and 24B. Here, the access load in the time slot 4:00 to 5:00 will be focused and explained.

As illustrated in FIG. 21A, the access load of the storage device A is 545. As illustrated in FIG. 22A, the access load of the storage device B is 5435. As illustrated in FIG. 23A, the access load of the storage device C is 23. As illustrated in FIG. 24A, the average value of the access loads is 2001.

The volume management server 15 calculates the difference between the access load of each of the storage devices 25 and the average value. Here, the difference between the storage device B and the average value is 5435−2001=3434. The threshold value set in advance is assumed to be 2000. Since the difference (3434) between the access load and the average value of the storage device B exceeds the threshold value (2000), the volume management server 15 executes the processing at S104 to S105 in FIG. 20. This will be described by using FIGS. 25 to 28.

Figure 25B:
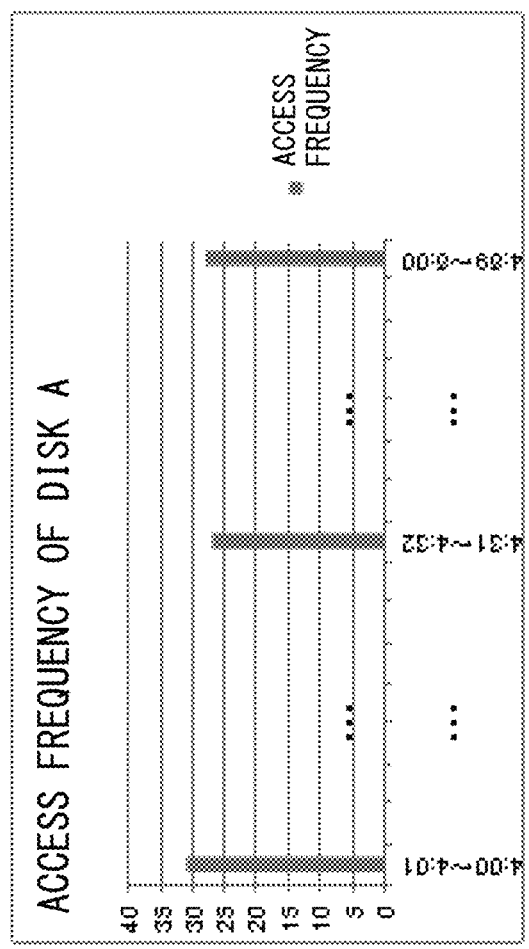
FIG. 25B illustrates a graph corresponding to FIG. 25A.
Figure 26B:
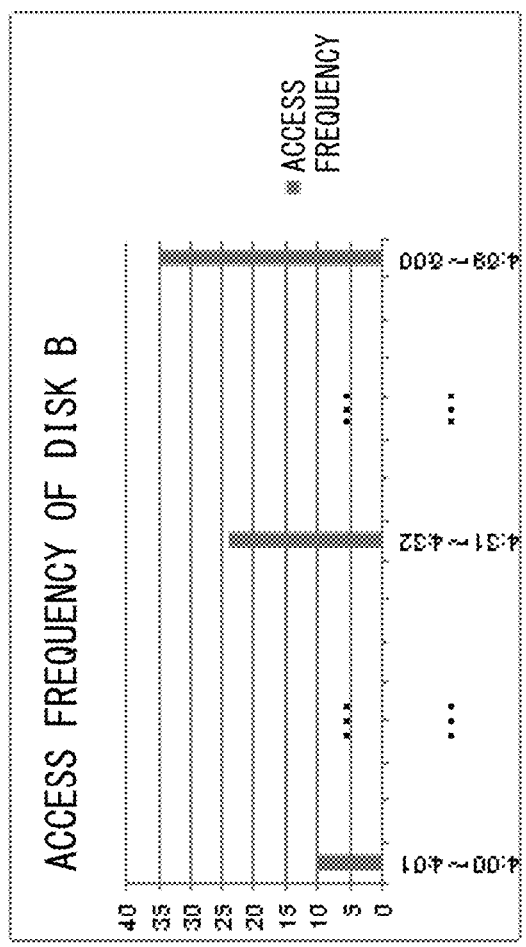
FIG. 26B illustrates a graph corresponding to FIG. 26A.
Figure 27B:
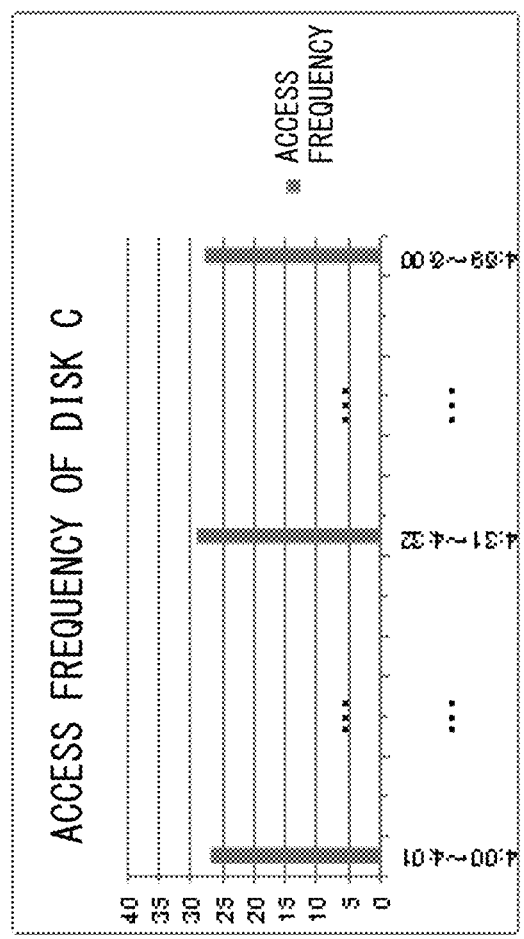
FIG. 27B illustrates a graph corresponding to FIG. 27A.
Figure 28B:
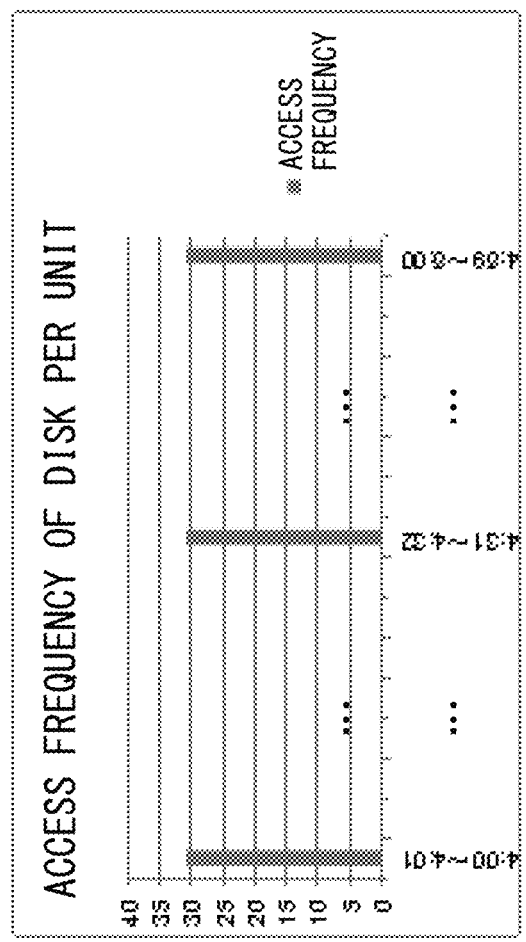
FIG. 28B illustrates a graph corresponding to FIG. 28A.

FIG. 25A illustrates a work table aggregating the access frequency every minute obtained by adding the read frequency and the write frequency of the I/O periodic table 33 for a disk B1 of the storage device B. FIG. 25B illustrates a graph corresponding to FIG. 25A. FIG. 26A illustrates a work table aggregating the access frequency every minute obtained by adding the read frequency and the write frequency of the I/O periodic table 33 for a disk B2 of the storage device B. FIG. 26B illustrates a graph corresponding to FIG. 26A. FIG. 27A illustrates a work table aggregating the access frequency every minute obtained by adding the read frequency and the write frequency of the I/O periodic table 33 for a disk B3 of the storage device B. FIG. 27B illustrates a graph corresponding to FIG. 27A. FIG. 28A illustrates an average value of the access frequency of the work tables for every minute illustrated in FIGS. 25 to 27. FIG. 28B illustrates a graph corresponding to FIG. 28A.

The volume management server 15 executes the following processing to the applicable time (time slot 4:00 to 5:00) of the storage device 25 in which the difference between the access load of the storage device 25 and the average value exceeds the threshold value. That is, the volume management server 15 acquires a difference between the access load of each disk belonging to the storage device 25 by the unit of a minute and the average value of the access loads of all the disks. Here, it is assumed that there are three disks B1, B2, and B3 in the storage device B, and a time slot 4:31 to 4:32 is focused and explained.

First, the average value of the access loads by the unit of a minute of the storage device B is 5435/60≈91. Moreover, since there are three disks in the storage device B, the average value of the access loads by the unit of a minute of each disk is 91/3≈31. Here, the access loads of the disks B1, B2, and B3 in the time slot of 4:31 to 4:32 are 27, 24, and 29, respectively. The differences between the access loads of the disks B1, B2, and B3 and the average value are 4, 7, and 2, respectively. Assuming that the threshold value set in advance is 10, the differences between the access loads of the disks B1, B2, and B3 and the average value all fall under the threshold value. Also in the other time slots, the differences between the access loads of the disks B1, B2, and B3 and the average value all fall under the threshold value. From this fact, it is known that the access load to the storage device B is high but the access loads to each of the disks B1, B2, and B3 in the storage device are low. In this example, in the replica creation processing, the storage device B is excluded from the rebalancing targets, and rebalancing cannot be performed for distributing the access loads of the storage device B.

Thus, the volume management server 15 selects the disk with the largest number of execution times of the read processing in the disks B1, B2, and B3 by using the prediction replica creation processing using the I/O periodic table 33. The volume management server 15 instructs the I/O server 18 to create a replica of the data in the selected disk 26.

By performing rebalancing among the storage devices as described above, even if abnormality occurs in the storage device or in the disk in the storage device, data is not lost. For example, when the storage device B fails during transfer of data from the storage device A to the storage device C, redundancy of the replica lowers, but recency of the data can be guaranteed by combining the storage device A with the storage device C. Moreover, when the volume management server 15 recognizes lowering of redundancy of a replica, the volume management server 15 forcedly executes the replica creation processing so that the redundancy of the replica becomes 2.

In an environment such as a large-scaled cloud in which a plurality of the storage devices 25 and I/O servers 18 are present, a bandwidth between the I/O server 18 and the storage device 25 is important. By effectively utilizing the data required for reading/writing corresponding to input/output requests and held in the cache, rebalancing of the storage device 25 can be executed without applying a load to the network bandwidth.

According to this embodiment, when a storage device is added, by effectively utilizing the access request from the client device, the rebalancing processing between the storages can be efficiently executed without applying a load to the network bandwidth. Moreover, input/output performances of the storage system can be utilized to the maximum. Thus, by using the storage system in this embodiment, efficiencies of the operations and services can be improved without affecting the operations.

Moreover, even when abnormality occurs in the storage device or the disk included in the storage system in this embodiment, since the data is made redundant any time, the operations can be continued without losing data.

According to one embodiment, efficiency of data rebalancing in the storage system can be improved.

The present invention is not limited to the embodiment described above but can employ various configurations or embodiments within a range not departing from the gist of the present invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage system comprising:
    a plurality of storing devices configured to store data;
    a cache memory configured to hold data;
    an access control unit configured to access any one of the plurality of storing devices when a read access request for reading of first target data is made from an information processing terminal, to hold the first target data read from the any one of the plurality of storing devices in the cache memory, to return the first target data to the information processing terminal, and to select a storing device which has not stored the first target data among the plurality of storing devices; and
    a writing unit configured to write the first target data held in the cache memory in the selected storing device to create a replica of the first target data acquired using a timing of the read access request,
    the access control unit accesses any one of the plurality of storing devices when a write access request for writing of second target data is made from the information processing terminal and stores the second target data in the cache memory, and the writing unit writes the second target data stored in the cache memory in a storing device which has not stored the second target data among the plurality of storing devices.

2. The storage system according to claim 1, the storage system further comprising:
    a load monitoring unit configured to monitor an access load due to reading or writing with respect to the plurality of storing devices, wherein
    the access control unit accesses a storing device with a smallest access load among the plurality of storing devices based on a result of monitoring when the read access request for reading of the first target data or the write access request for writing of the second target data is made from the information processing terminal, and stores the first target data or the second target data in the cache memory.

3. The storage system according to claim 2, wherein the access control unit obtains the first target data from the storing device with the smallest access load among the plurality of storing devices based on a result of the monitoring when the read access request for reading of the first target data is made from the information processing terminal, holds the first target data in the cache memory, and returns the first target data to the information processing terminal.

4. The storage system according to claim 2, wherein
    the access control unit writes the second target data in the storing device with the smallest access load among the plurality of storing devices based on a result of the monitoring when the write access request for the second target data is made from the information processing terminal, and stores the second target data in the cache memory; and
    the writing unit writes the second target data stored in the cache memory in a storing device other than the storing device with the smallest access load.

5. The storage system according to claim 1, the storage system further comprising:
    a replica deletion unit configured to delete a replica of a virtual volume stored in any one of the storing devices when there are three or more replicas of the virtual volume in the plurality of storing devices, the virtual volume being obtained by virtualizing a volume of the plurality of storing devices, in a case that a writing access load of a replica is greater than a threshold value, or in a case that a free space of a storing device is smaller than a first threshold value in creation of a replica.

6. The storage system according to claim 5, wherein the replica deletion unit selects a replica in a storing device with a smallest access load among the plurality of storing devices including a replica based on a result of the monitoring, and when the replica deletion unit determines that there is no reading access to the selected replica at an access frequency greater than a second threshold value at a current time and after based on access frequency information indicating an access frequency to the plurality of storing devices, the access frequency to the plurality of storing devices being gathered at each time, the replica deletion unit deletes the selected replica.

7. The storage system according to claim 1, the storage system further comprising:
    a replica creation unit configured to subdivide a time slot among a plurality of time slots when a difference between an access load to any one of the plurality of storing devices at the time slot and an average of a plurality of access loads to all of the plurality of storing devices at the time slot is greater than a third threshold value, and to create a replica in a disk with a largest access load at a time prior to any one of subdivided time slots when an access load to the any one of the storing devices is not greater than a fifth threshold value in a case that a difference between an access load to any one of a plurality of disks of the any one of the storing devices at the any one of the subdivided time slots and an average of a plurality of access loads to all of the plurality of disks at the any one of the subdivided time slots is smaller than a fourth threshold value.

8. A non-transitory computer-readable recording medium having stored therein a program for causing a computer to execute a data rebalancing process comprising:
    accessing any one of a plurality of storing devices storing data when a read access request for reading of first target data is made from an information processing terminal, and holding the first target data read from the any one of the plurality of storing devices in a cache memory;
    returning the first target data to the information processing terminal;

selecting a storing device which has not stored the first target data among the plurality of storing devices;

writing the first target data held in the cache memory in the selected storing device to create a replica of the first target data acquired using a timing of the read access request;

accessing any one of the plurality of storing devices when a write access request for writing of second target data is made from the information processing terminal, and storing the second target data in the cache memory; and writing the second target data stored in the cache memory in a storing device which has not stored the second target data among the plurality of storing devices.

9. The non-transitory computer-readable recording medium according to claim 8, the data rebalancing process further comprising:

monitoring an access load due to reading or writing with respect to the storing device, wherein the computer accesses a storing device with a smallest access load among the plurality of storing devices based on a result of the monitoring when the read access request for reading of the first target data or the write access request for writing of the second target data is made from the information processing terminal, and stores the first target data or the second target data in the cache memory.

10. The non-transitory computer-readable recording medium according to claim 9, wherein the computer obtains the first target data from the storing device with the smallest access load among the plurality of storing devices based on a result of the monitoring when the read access request for reading of the first target data is made from the information processing terminal, holds the first target data in the cache memory, and returns the first target data to the information processing terminal.

11. The non-transitory computer-readable recording medium according to claim 9, wherein the computer writes the second target data in the storing device with the smallest access load among the plurality of storing devices based on a result of the monitoring when the write access request for the second target data is made from the information processing terminal, and stores the second target data in the cache memory; and the computer writes the second target data stored in the cache memory in a storing device other than the storing device with the smallest access load.

12. The non-transitory computer-readable recording medium according to claim 8, the data rebalancing process further comprising:

deleting a replica of a virtual volume stored in any one of the storing devices when there are three or more replicas of the virtual volume in the plurality of storing devices, the virtual volume being obtained by virtualizing a volume of the plurality of storing devices, in a case that a writing access load of a replica of the virtual volume is greater than a threshold value, or in a case that a free space of a storing device is smaller than a first threshold value in creation of a replica.

13. The non-transitory computer-readable recording medium according to claim 12, wherein the computer selects a replica in a storing device with a smallest access load among the plurality of storing devices including a replica based on a result of the monitoring, and when the computer determines that there is no reading access to the selected replica at an access frequency greater than a second threshold value at a current time and after based on access frequency information indicating an access frequency to the plurality of storing devices, the access frequency to the plurality of storing devices being gathered at each time, the computer deletes the selected replica.

14. The non-transitory computer-readable recording medium according to claim 8, the data rebalancing process further comprising:

subdividing a time slot among a plurality of time slots when a difference between an access load to any one of the storing devices at the time slot and an average of a plurality of access loads to all of the storing devices at the time slot is greater than a third threshold value, and creating a replica in a disk with a largest access load at a time prior to any one of subdivided time slots when an access load to the any one of the storing devices is not greater than a fifth threshold value in a case that a difference between an access load to any one of a plurality of disks of the any one of the storing devices at the any one of the subdivided time slots and an average of a plurality of access loads to all of the plurality of disks at the any one of the subdivided time slots is smaller than a fourth threshold value.

15. A data rebalancing method of data between a plurality of storing devices executed by a computer, the data rebalancing method comprising:

accessing any one of a plurality of storing devices storing data when a read access request for reading of first target data is made from an information processing terminal, and holding the first target data read from the any one of the plurality of storing devices in a cache memory by using the computer;

returning the first target data to the information processing terminal by using the computer;

selecting a storing device which has not stored the first target data among the plurality of storing devices by using the computer;

writing the first target data held in the cache memory in the selected storing device to create a replica of the first target data acquired using a timing of the read access request by using the computer;

accessing any one of the plurality of storing devices when a write access request for writing of second target data is made from the information processing terminal, and storing the second target data in the cache memory by using the computer; and writing the second target data stored in the cache memory in a storing device which has not stored the second target data among the plurality of storing devices by using the computer.

16. The data rebalancing method according to claim 15, the rebalancing method further comprising:

monitoring an access load due to reading or writing with respect to the storing device by using the computer, wherein the computer accesses a storing device with a smallest access load among the plurality of storing devices based on a result of the monitoring when the read access request for reading of the first target data or the write access request for writing of the second target data is made from the information processing terminal, and stores the first target data or the second target data in the cache memory.

17. The data rebalancing method according to claim 16, wherein the computer obtains the first target data from the storing device with the smallest access load among the plurality of storing devices based on a result of the monitoring when the read access request for reading of the first target data is made from the information processing terminal, stores the first target data in the cache memory, and transmits the first target data to the information processing terminal.

18. The data rebalancing method according to claim 16, wherein the computer writes the second target data in the storing device with the smallest access load among the plurality of storing devices based on a result of the monitoring when the write access request for the second target data is made from the information processing terminal, and stores the second target data in the cache memory, and the computer writes the second target data stored in the cache memory in a storing device other than the storing device with the smallest access load.

19. The storage system according to claim 1, the storage system further comprising:

a load monitoring unit configured to monitor an access load due to reading or writing with respect to the plurality of storing devices, wherein the writing unit makes writing of the second target data in the storing device which has not stored the second target data pending based on a result of the monitoring and performs the writing that is pending after any one of the plurality of storing devices is accessed based on an access request from the information processing terminal.

\* \* \* \* \*